United States Patent
Komatsu et al.

(10) Patent No.: US 7,992,048 B2
(45) Date of Patent: *Aug. 2, 2011

(54) COMPUTER SYSTEM AND METHOD FOR PERFORMING FAILURE DETECTING PROCESSING FOR A LOGICAL PATH

(75) Inventors: Yuki Komatsu, Yokohama (JP); Makoto Aoki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,272

(22) Filed: Nov. 3, 2009

(65) Prior Publication Data

US 2010/0050022 A1 Feb. 25, 2010

Related U.S. Application Data

(63) Continuation of application No. 11/441,074, filed on May 26, 2006, now Pat. No. 7,634,691.

(30) Foreign Application Priority Data

Mar. 29, 2006 (JP) ................. 2006-091952

(51) Int. Cl.
 *G06F 11/00* (2006.01)
 *G06F 11/34* (2006.01)
(52) U.S. Cl. ............... 714/43; 714/30; 714/42; 714/4.3; 710/17
(58) Field of Classification Search ............... 714/4, 43, 714/4.21, 4.3, 30, 42; 710/17
See application file for complete search history.

(56) References Cited

U.S. PATENT DOCUMENTS

| 5,218,601 A | * | 6/1993 | Chujo et al. | .................. 370/228 |
| 5,568,491 A | | 10/1996 | Beal et al. | |
| 5,941,992 A | | 8/1999 | Croslin et al. | |

(Continued)

FOREIGN PATENT DOCUMENTS

EP 1 505 788 2/2005

(Continued)

OTHER PUBLICATIONS

Effect of Unreliable Nodes on QoS Routing by Gokhale and Tripathi published Oct. 31, 1999 in Proceedings of Seventh International Conference on Network Protocols ISBN: 0-7695-0412-1, pp. 173-181.

(Continued)

*Primary Examiner* — Scott T Baderman
*Assistant Examiner* — Joseph Schell
(74) *Attorney, Agent, or Firm* — Brundidge & Stanger, P.C.

(57) ABSTRACT

Provided is a computer system including at least one host computer; and at least one storage system, characterized in that: the storage system has a disk drive and a disk controller, and provides a storage area of the disk drive as at least one logical unit; upon detecting a failure in a logical path serving as an access route from the host computer to the logical unit, the host computer specifies logical paths for accessing the same logical unit that is connected to the logical path where the failure is detected; the host computer executes failure detecting processing for the specified logical paths to judge whether the specified logical paths are normal or not; the host computer selects normal logical paths out of the specified logical paths; and the host computer accesses the logical unit via the normal logical paths selected.

3 Claims, 24 Drawing Sheets

PATH FAILURE RECOVERY PROCESSING

U.S. PATENT DOCUMENTS

| | | | |
|---|---|---|---|
| 6,341,356 B1 | 1/2002 | Johnson et al. | |
| 6,526,521 B1 * | 2/2003 | Lim | 714/4 |
| 6,606,630 B1 * | 8/2003 | Gunlock | 1/1 |
| 6,636,981 B1 | 10/2003 | Barnett et al. | |
| 6,704,812 B2 | 3/2004 | Bakke et al. | |
| 6,725,295 B2 * | 4/2004 | Iwatani | 710/38 |
| 6,804,712 B1 | 10/2004 | Kracht | |
| 6,877,107 B2 * | 4/2005 | Giotta et al. | 714/4.3 |
| 6,907,011 B1 * | 6/2005 | Miller et al. | 370/254 |
| 7,120,912 B2 | 10/2006 | Kadoiri et al. | |
| 7,134,040 B2 | 11/2006 | Ayres | |
| 7,222,172 B2 | 5/2007 | Arakawa et al. | |
| 7,257,744 B2 | 8/2007 | Sabet et al. | |
| 7,340,649 B2 | 3/2008 | Angamuthu et al. | |
| 7,454,533 B2 | 11/2008 | Miki | |
| 2003/0051195 A1 | 3/2003 | Bosa et al. | |
| 2003/0204786 A1 | 10/2003 | Dinker et al. | |
| 2004/0205238 A1 | 10/2004 | Doshi et al. | |
| 2005/0015685 A1 * | 1/2005 | Yamamoto | 714/54 |
| 2005/0033804 A1 | 2/2005 | Iwami et al. | |
| 2005/0097243 A1 * | 5/2005 | Yamashita et al. | 710/38 |
| 2005/0120259 A1 * | 6/2005 | Aoki | 714/5 |
| 2005/0234941 A1 | 10/2005 | Watanabe | |
| 2005/0278583 A1 * | 12/2005 | Lennert et al. | 714/43 |
| 2006/0026346 A1 | 2/2006 | Kadoiri et al. | |

FOREIGN PATENT DOCUMENTS

| | | |
|---|---|---|
| EP | 1 589 411 | 10/2005 |
| EP | 1 621 992 | 2/2006 |
| JP | 2001-154929 A | 6/2001 |
| JP | 2002-229740 A | 8/2002 |
| JP | 2003-316522 A | 11/2003 |
| JP | 2004 185093 | 7/2004 |
| JP | 2004-287980 A | 10/2004 |
| JP | 2006-040026 A | 2/2006 |

OTHER PUBLICATIONS

European Search Report in European Patent Application No. 07251026.6 dated Feb. 11, 2011.

Japanese Office Action in Japanese Application No. 2006-091952 mailed Apr. 5, 2011 with partial English translation.

* cited by examiner

| 1211 | 1212 | 1213 | 1214 | 1215 |
|---|---|---|---|---|
| PATH NUMBER | HBA NUMBER | CHA NUMBER | CHA PORT NUMBER | LU NUMBER |
| PATH1 | HBA1 | CHA1 | 1A | LU1 |
| ⋮ | ⋮ | ⋮ | ⋮ | ⋮ |

121
PATH CONNECTION INFORMATION TABLE

FIG. 2

| 1221 | 1222 | 1223 | 1224 | 1225 |
|---|---|---|---|---|
| PATH NUMBER | OPERATION STATE | FAILURE COUNT | LAST FAILURE DATE/TIME | FIRST FOUND FAILURE |
| PATH1 | ONLINE | 1 | 2005/12/06 11:15 | — |
| PATH2 | ONLINE | 3 | 2005/12/31 17:42 | ○ |
| ⋮ | ⋮ | ⋮ | ⋮ | ⋮ |

122
PATH FAILURE INFORMATION TABLE

FIG. 3

| 1231 | 1232 |
|---|---|
| FAILURE ORIGIN | FAILURE DATE/TIME |
| PHYSICAL PATH CONNECTED TO HBA1, OR HBA1 | 2006/01/30 12:23 |
| LU1 | 2004/03/12 09:33 |
| ⋮ | ⋮ |

123
FAILURE ORIGIN TABLE

FIG. 4

| 1241 | 1242 | 1243 | 1244 | 1245 |
|---|---|---|---|---|
| LU NUMBER | STORAGE NAME | LOAD BALANCE POINT | CURRENT I/O COUNT | SWITCHING I/O COUNT THRESHOLD |
| LU1 | STORAGE1 | PATH 2 | 14 TIMES | 20 TIMES |
| LU2 | STORAGE1 | PATH 6 | 2 TIMES | 20 TIMES |
| ⋮ | ⋮ | ⋮ | ⋮ | ⋮ |

124
LOAD BALANCE POINT SWITCHING TABLE

PATH STATE CHANGE CHECKING TABLE

| PATH NUMBER (1251) | PRE-FAILURE DETECTION STATE (1252) | POST-FAILURE DETECTION STATE (1253) |
|---|---|---|
| PATH1 | OFFLINE | ONLINE |
| ... | ... | ... |

LU CONNECTION DESTINATION HOST TABLE

| LU NUMBER (3211) | HOST NAME (3212) |
|---|---|
| LU1 | HOST1 |
| LU1 | HOST2 |
| ... | ... |

FIG. 7

| CHA NUMBER (3221) | HOST NAME (3222) |
|---|---|
| CHA1 | HOST1 |
| CHA1 | HOST2 |
| ... | ... |

322
CHA CONNECTION DESTINATION HOST TABLE

FIG. 8

| CHA PORT NUMBER (3231) | HOST NAME (3232) |
|---|---|
| PORT1A | HOST1 |
| PORT1A | HOST1 |
| ... | ... |

323
CHA PORT CONNECTION DESTINATION HOST TABLE

FIG. 9

| FAILURE ORIGIN 3241 | INFORMATION SOURCE HOST NAME 3242 | FAILURE DATE/TIME 3243 |
|---|---|---|
| PHYSICAL PATH CONNECTED TO HBA1, OR HBA1 | HOST1 | 2006/01/30 12:23 |
| CHA1 | HOST 2 | 2004/06/12 08:40 |
| ⋮ | ⋮ | ⋮ |

324

COMPREHENSIVE HOST FAILURE ORIGIN TABLE

FIG. 10

LOAD BALANCING PROCESSING

FAILURE DEALING PROCESSING

ALTERNATIVE PATH SELECTING PROCESSING

FAILURE DETECTING PROCESSING IN FAILURE DEALING PROCESSING

PROPAGATOR PATH BLOCKING PROCESSING

FAILURE ORIGIN ESTIMATING PROCESSING

FAILURE ORIGIN CONFIRMING PROCESSING

OFFLINE PATH FAILURE DETECTING PROCESSING

VALIDITY CHECKING PROCESSING

ALL-PATH FAILURE DETECTING PROCESSING

PATH FAILURE RECOVERY PROCESSING

FAILURE RECOVERY CONFIRMING PROCESSING

LOAD BALANCING PROCESSING

FAILURE DEALING PROCESSING

COMPUTER SYSTEM AND METHOD FOR PERFORMING FAILURE DETECTING PROCESSING FOR A LOGICAL PATH

CROSS-REFERENCED TO RELATED APPLICATIONS

The present application is a continuation application of application Ser. No. 11/441,074, filed May 26, 2006, now U.S. Pat. No. 7,634,691, which claims priority from Japanese patent application P2006-091952 filed on Mar. 29, 2006, the contents of which are hereby incorporated by reference into this application.

BACKGROUND OF THE INVENTION

This invention relates to a computer system having a host computer and a storage system. More specifically, this invention relates to a technique of switching logical paths that connect a host computer and a storage system.

There have been known multi-path computer systems in SAN (Storage Area Network) environments. A multi-path computer system has a storage system and a host computer, which are connected to each other by a SAN containing a Fibre Channel switch.

A storage system in a multi-path computer system provides a logical unit, which is connected to a host computer via a plurality of logical paths. The logical paths are paths provided for redundancy in accordance with combinations of physical paths along communication routes between a host computer and a storage system. The physical paths are I/O paths connecting the host computer and the storage system to each other. The I/O paths are, for example, SCSI cables or Fibre cables.

Generally speaking, a plurality of logical paths pass common components. Accordingly, when a failure is detected in one logical path, there is a strong possibility that other logical paths are also experiencing a failure. In the case of a failure in a Fibre Channel switch, for example, every logical path that passes this Fibre Channel switch suffers a failure.

A host computer in a multi-path computer system needs to choose which logical path is to be used for transmission of an I/O request to a logical unit set in a storage system.

A technique of selecting a logical path by round robin is disclosed in JP 2004-185093 A. According to this technique, the host computer chooses a logical path by round robin and uses the chosen logical path in sending the I/O request.

SUMMARY OF THE INVENTION

In prior art, a problem arises when a failure occurs. For instance, when detecting a failure in a logical path of a first choice, the host computer selects a logical path by round robin as the second choice. The host computer then re-transmits the I/O request over the logical path of the second choice. If a failure is detected in the logical path of the second choice, the host computer selects a logical path by round robin as a third choice, and re-transmits the I/O request over the logical path of the third choice. The host computer thus repeats this processing until the I/O request can be transmitted through a normal logical path.

According to the technique of selecting a logical path by round robin, the host computer carries out re-transmission of the I/O request and relevant processing upon detecting a failure in a logical path. Detection of a logical path failure therefore takes long.

These cause the problem of processing delay upon occurrence of a failure in the technique of selecting a logical path by round robin.

This invention has been made in view of the problem described above, and it is therefore an object of this invention to provide a computer system that allows less processing delay upon occurrence of a failure.

According to an exemplary embodiment of this invention, there is provided a computer system, comprising: at least one host computer having a processor, a memory, and an interface; and at least one storage system connected to the host computer, wherein the storage system has a disk drive for storing data that is requested to be written by the host computer and a disk controller for controlling the disk drive, and provides a storage area of the disk drive as at least one logical unit to the host computer, and wherein upon detecting a failure in a logical path serving as an access route from the host computer to the logical unit, the host computer specifies logical paths for accessing the logical unit shared by the logical path where the failure is detected, wherein the host computer executes failure detecting processing for the specified logical paths to judge whether the specified logical paths are normal or not, wherein the host computer selects normal logical paths out of the specified logical paths, and wherein the host computer accesses the logical unit via the selected normal logical paths.

The representative embodiment of this invention reduces processing delay upon occurrence of a failure.

BRIEF DESCRIPTION OF THE DRAWINGS

The present invention can be appreciated by the description which follows in conjunction with the following figures, wherein:

FIG. 2 is a configuration diagram of the path connection information table stored in the host computer according to the first embodiment of this invention;

FIG. 3 is a configuration diagram of the path failure information table stored in the host computer according to the first embodiment of this invention;

FIG. 4 is a configuration diagram of the failure origin table stored in the host computer according to the first embodiment of this invention;

FIG. 5 is a configuration diagram of the load balance point switching table stored in the host computer according to the first embodiment of this invention;

FIG. 6 is a configuration diagram of the path state change checking table stored in the host computer according to the first embodiment of this invention;

FIG. 7 is a configuration diagram of the LU connection destination host table stored in the management server according to the first embodiment of this invention;

FIG. 8 is a configuration diagram of the CHA connection destination host table stored in the management server according to the first embodiment of this invention;

FIG. 9 is a configuration diagram of the CHA port connection destination host table stored in the management server according to the first embodiment of this invention;

FIG. 10 is a configuration diagram of the comprehensive host failure origin table stored in the management server according to the first embodiment of this invention;

DETAILED DESCRIPTION OF THE PREFERRED EMBODIMENTS

Embodiments of this invention will be described below with reference to the accompanying drawings.

First Embodiment

Figure 1A:
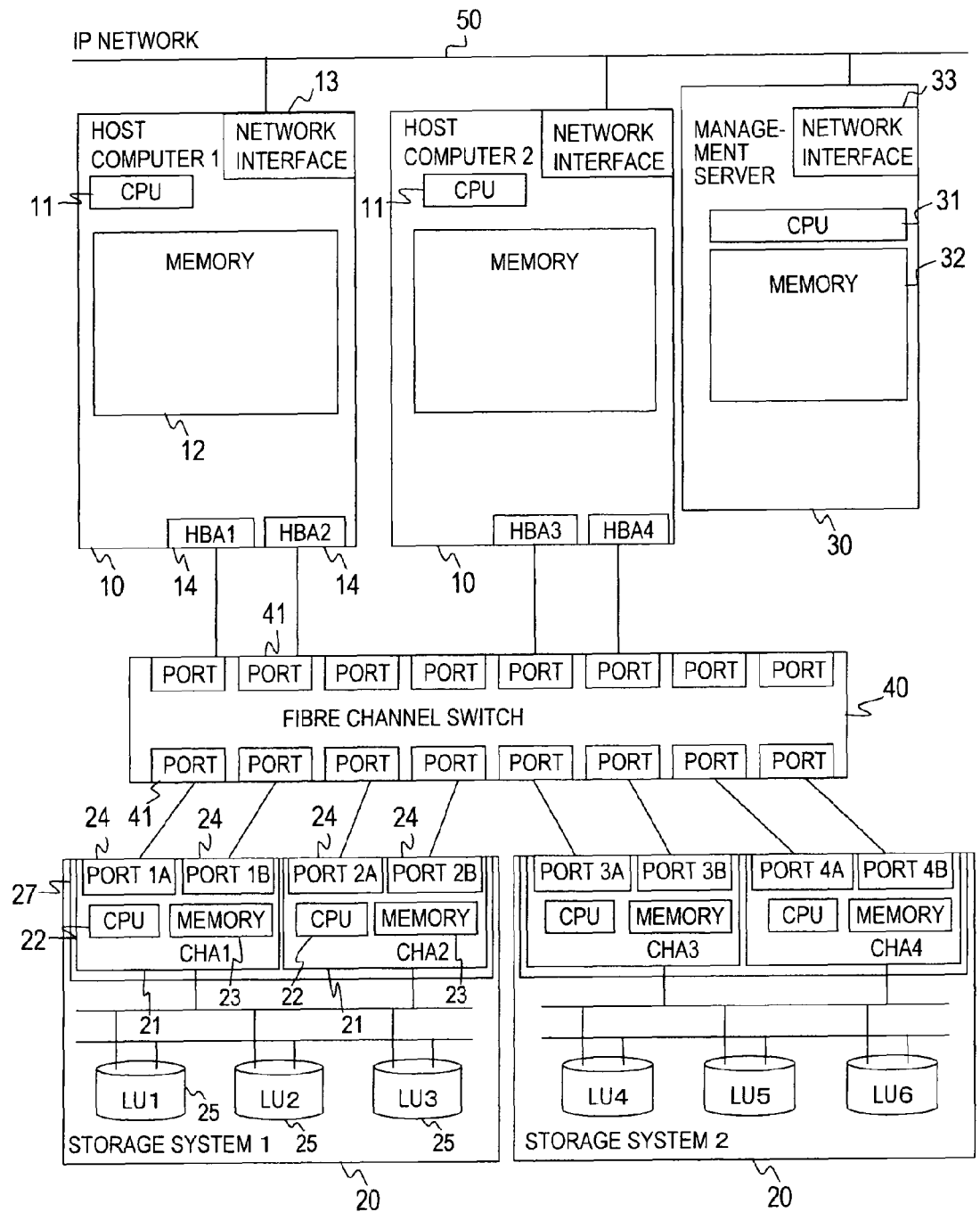
FIG. 1A is a block diagram showing a configuration of a computer system according to a first embodiment of this invention.
Figure 1B:
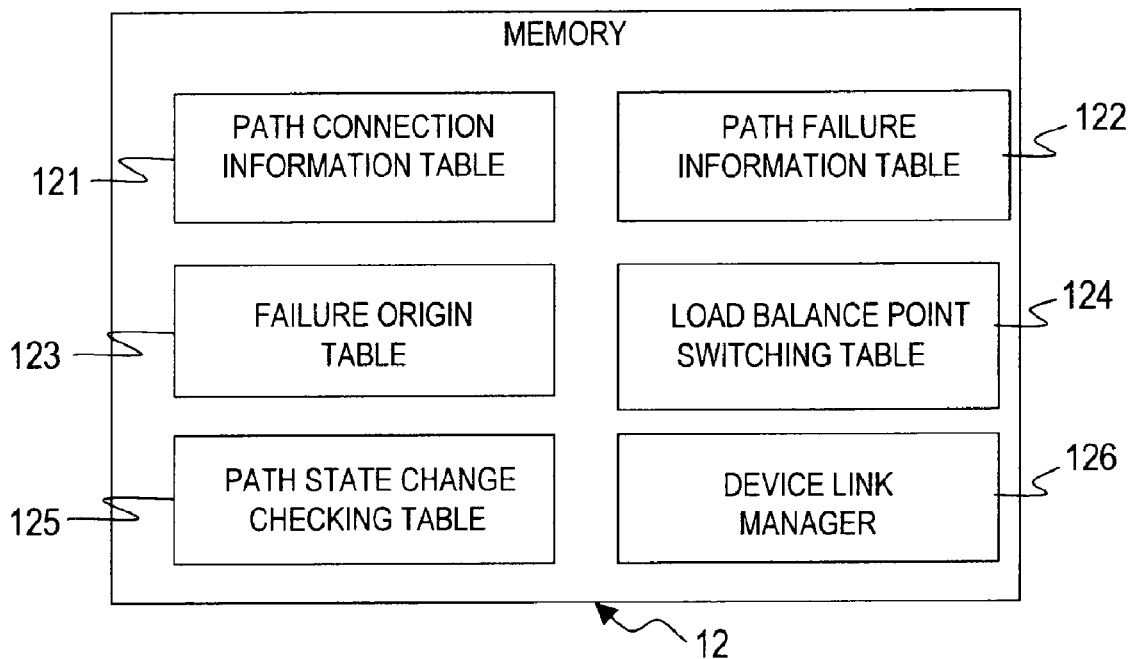
FIG. 1B is a block diagram showing a configuration of a memory of a host computer according to a first embodiment of this invention.
Figure 1C:
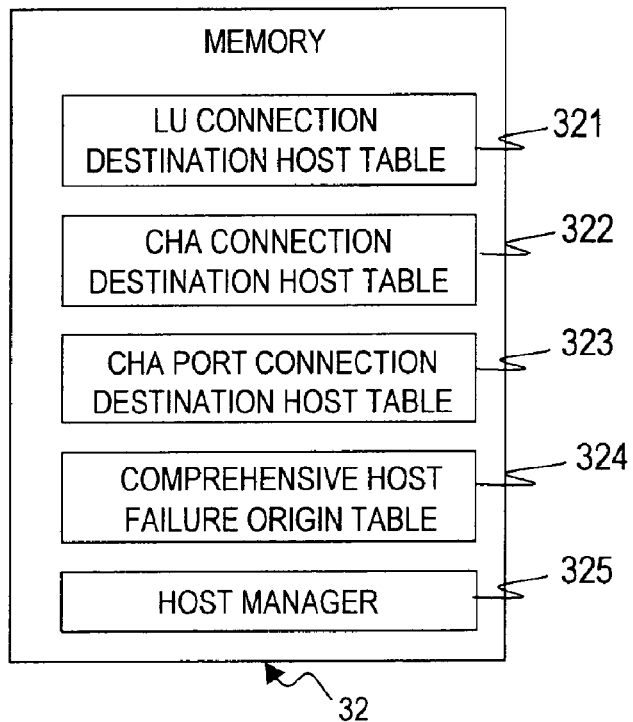
FIG. 1C is a block diagram showing a configuration of a memory of a management server according to a first embodiment of this invention.

FIG. 1A is a block diagram showing a configuration of a computer system according to a first embodiment of this invention. FIG. 1B is a block diagram showing a configuration of a memory of a host computer according to a first embodiment of this invention. FIG. 1C is a block diagram showing a configuration of a memory of a management server according to a first embodiment of this invention.

The computer system has a host computer 10, a storage system 20, a management server 30, and a Fibre Channel switch 40.

The host computer 10 and the storage system 20 are connected to each other by a SAN. The SAN is composed of one or more Fiber Channel switches 40.

In this embodiment, a plurality of paths connect the host computer 10 to a logical unit (LU) 25 provided by the storage system 20. The paths are access routes from the host computer 10 to the LU 25. To be specific, the paths are logical paths provided for redundancy in accordance with combinations of physical paths along communication routes between the host computer and the storage system.

The host computer 10 and the management server 30 are connected to each other by an IP network 50.

FIG. 1A shows two host computers 10 but the computer system can have as many host computers 10 as necessary. Similarly, FIG. 1A shows two storage systems 20 but the computer system can have as many storage systems 20 as necessary.

Each storage system 20 has a disk controller 27 and a disk drive.

The disk controller 27 reads and writes data in the disk drive. The disk controller 27 provides storage areas of the disk drive as the logical units (LUs) 25 to the host computer 10.

The disk controller 27 has one or more channel adapters (CHAs) 21. Each disk controller 27 has two CHAs 21 in FIG. 1A, but can have as many CHAs 21 as necessary.

Each CHA 21, which controls data transfer to and from the host computer 10, has a CPU 22, a memory 23, and a CHA port 24. The CPU 22 performs various types of processing by executing programs that are stored in the memory 23. The memory 23 stores programs executed by the CPU 22, information required by the CPU 22, and others.

The CHA port 24 is an interface connected to the SAN. Each CHA 21 has two CHA ports 24 in FIG. 1A, but can have as many CHA ports 24 as necessary.

Each host computer 10, which reads and writes data in the storage system 20, has a CPU 11, a memory 12, a network interface 13, and a host bus adapter (HBA) 14. There are two HBAs 14 in each host computer 10 in FIG. 1A, but the host computer 10 can have as many HBAs 14 as necessary.

The network interface 13 is an interface connected to the IP network 50. The HBA 14 is an interface connected to the SAN.

The CPU 11 performs various types of processing by executing programs that are stored in the memory 12.

The memory 12 stores programs executed by the CPU 11, information required by the CPU 11, and others. To be specific, the memory 12 stores a path connection information table 121, a path failure information table 122, a failure origin table 123, a load balance point switching table 124, a path state change checking table 125, and a device link manager 126.

The path connection information table 121 is for managing the route of a path. Details of the path connection information table 121 will be described with reference to FIG. 2.

The path failure information table 122 is for managing the current state of a path. The path failure information table 122 is also used to manage information on past failures of a path. Details of the path failure information table 122 will be described with reference to FIG. 3.

The failure origin table 123 is for managing a failure origin estimated by the host computer 10. A failure origin is a site where the cause of a failure in a path is located. To be specific, the HBA 14 of the host computer 10, the CHA 21 of the storage system 20, the CHA port 24 in the CHA 21 of the storage system 20, the LU 25 provided by the storage system 20, or a physical path is a possible failure origin. Details of the origin table 123 will be described with reference to FIG. 4.

The load balance point switching table 124 is for managing which path is to be used in sending an I/O request. The host computer 10 refers to the load balance point switching table 124 to choose a path over which an I/O request is sent. Details of the load balance point switching table 124 will be described with reference to FIG. 5.

The path state change checking table 125 is for managing the state of a path before and after failure detecting processing. Details of the path state change checking table 125 will be described with reference to FIG. 6.

The device link manager 126 is a program for managing paths. The device link manager 126 also provides a redundant path for a physical path that connects the host computer 10 and the storage system 20.

The device link manager 126 has a load balancing function. With the load balancing function, the device link manager 126 allocates I/O requests to different paths and thus balances the load among paths.

For instance, after a given count of I/O requests is sent over one path, the device link manager 126 chooses a path to be used next. The device link manager 126 uses the chosen path for transmission of the next set of I/O requests. Alternatively, the device link manager 126 may use the same path in transmitting I/O requests that are destined to consecutive blocks.

The device link manager 126 blocks (takes off line) a path in which a failure is detected upon detection. The device link manager 126 thus keeps from sending an I/O request over a path in which a failure is detected. A state in which a path is not blocked is called an online state.

The device link manager 126 performs path failure detecting processing (path health check).

To be specific, the device link manager 126 sends, to the storage system 20, a failure detection signal (conduction check signal) over a path the state of which is to be checked. Receiving the signal, the storage system 20 sends the state of the path to the device link manager 126. In this manner, the device link manager 126 checks the state of a path. A path can be in one of two states, normal and failure.

The Fibre Channel switch 40, which constitutes the SAN, controls communications between the host computer 10 and the storage system 20. The Fibre Channel switch 40 has a plurality of ports 41, each of which is connected to the HBA 14 of the host computer 10 or the CHA port 24 of the storage system 20.

The management server 30 has a CPU 31, a memory 32, and a network interface 33.

The network interface 33 is an interface connected to the IP network 50.

The CPU 31 performs various types of processing by executing programs that are stored in the memory 32.

The memory 32 stores programs executed by the CPU 31, information required by the CPU 31, and others. To be specific, the memory 32 stores an LU connection destination host table 321, a CHA connection destination host table 322, a CHA port connection destination host table 323, a comprehensive host failure origin table 324, and a host manager 325.

The LU connection destination host table 321 shows the association between one LU 25 provided by the storage system 20 and the host computer 10 that can access this LU 25. Details of the LU connection destination host table 321 will be described with reference to FIG. 7.

The CHA connection destination host table 322 shows the association between one CHA 21 in the storage system 20 and the host computer 10 that is connected to the CHA 21. Details of the CHA connection destination host table 322 will be described with reference to FIG. 8.

The CHA port connection destination host table 323 shows the association between one CHA port 24 in the CHA 21 of the storage system 20 and the host computer 10 that is connected to this CHA port 24. Details of the CHA port connection destination host table 323 will be described with reference to FIG. 9.

The comprehensive host failure origin table 324 is for managing failure origins estimated by all host computers 10. Details of the comprehensive host failure origin table 324 will be described with reference to FIG. 10.

The host manager 325 is a program that manages information on the connection between the host computer 10 and the components of the storage system 20.

FIG. 2 is a configuration diagram of the path connection information table 121 stored in the host computer 10 according to the first embodiment of this invention.

The path connection information table 121 contains a path number 1211, an HBA number 1212, a CHA number 1213, a CHA port number 1214, and an LU number 1215.

The path number 1211 indicates an identifier unique to a path that connects the LU 25 provided by the storage system 20 and the HBA 14 of the host computer 10.

The HBA number 1212 indicates an identifier unique to the HBA 14 passed by a path identified by the path number 1211 of a record entry in question. The CHA number 1213 indicates an identifier unique to the CHA 21 passed by a path identified by the path number 1211 of a record entry in question. The CHA port number 1214 indicates an identifier unique to the CHA port 24 passed by a path identified by the path number 1211 of a record entry in question. The LU number 1215 indicates an identifier unique to the LU 25 passed by a path identified by the path number 1211 of a record entry in question.

The host computer 10 can specify a site where the cause of a path failure is located by referring to the path connection information table 121.

FIG. 3 is a configuration diagram of the path failure information table 122 stored in the host computer 10 according to the first embodiment of this invention.

The path failure information table 122 contains a path number 1221, an operation state 1222, a failure count 1223, a last failure date/time 1224, and a first found failure 1225.

The path number 1221 indicates an identifier unique to a path that connects the LU 25 provided by the storage system 20 and the HBA 14 of the host computer 10.

The operation state 1222 indicates the state of a path that is identified by the path number 1221 of a record entry in question. To be specific, the operation state 1222 indicates whether or not a path that is identified by the path number 1221 of a record entry in question is blocked. In the case where a path that is identified by the path number 1221 of a record entry in question is blocked, "offline" is stored as the operation state 1222. In the case where a path that is identified by the path number 1221 of a record entry in question is not closed, "online" is stored as the operation state 1222.

The failure count 1223 indicates how many times a failure has occurred in a path that is identified by the path number 1221 of a record entry in question. The last failure date/time 1224 indicates a date and time when a failure occurred last time in a path that is identified by the path number 1221 of a record entry in question.

The first found failure 1225 indicates whether or not a path that is identified by the path number 1221 of a record entry in question is a first found failure path. To be specific, in the case where a path that is identified by the path number 1221 of a record entry in question is a first found failure path, a check mark is stored as the first found failure 1225. The term first found failure path refers to a path in which a path failure is found earlier than any other paths that are affected by the same failure origin. In other words, the host computer 10 regards a path that is taken off line first in failure dealing processing of FIG. 12 as a first found failure path.

FIG. 4 is a configuration diagram of the failure origin table 123 stored in the host computer 10 according to the first embodiment of this invention.

The failure origin table 123 contains a failure origin 1231 and a failure date/time 1232.

The failure origin 1231 indicates a site estimated as the cause of a path failure. To be specific, stored as the failure origin 1231 is the identifier of the HBA 14 of the host computer 10, the CHA 21 of the storage system 20, the CHA port 24 in CHA 21 of the storage system 20, the LU 25 provided by the storage system 20, the Fibre Channel switch 40, or a physical path.

The failure date/time 1232 indicates a date and time when a failure recorded in a record entry in question has occurred.

FIG. 5 is a configuration diagram of the load balance point switching table 124 stored in the host computer 10 according to the first embodiment of this invention.

The load balance point switching table 124 contains an LU number 1241, a storage system name 1242, a load balance point 1243, a current I/O count 1244, and a switching I/O count threshold 1245.

The LU number 1241 indicates an identifier unique to the LU 25 provided by the storage system 20. The storage name 1242 indicates an identifier unique to the storage system 20 that provides the LU 25 identified by the LU number 1241 of a record entry in question.

The load balance point 1243 indicates an identifier unique to a path that is used to send an I/O request to the LU 25 identified by the LU number 1241 of a record entry in question.

The host computer 10 sequentially selects paths by round robin. For instance, the host computer 10 selects paths in the ascending order of path number. After choosing a path that has the largest path number, the host computer 10 chooses a path that has the smallest path number. To be specific, the host computer 10 sequentially selects paths in a manner that chooses a path identified by a path number "1" first and then a path identified by a path number "2". In this case, the host computer 10 may choose a path each time one I/O request is transmitted, or whenever a given count of I/O requests have been sent.

The host computer 10 stores the identifier of a chosen path as the load balance point 1243 of the load balance point switching table 124. Thus the host computer 10 sends an I/O request over a path chosen by round robin.

The current I/O count 1244 indicates how many I/O requests the host computer 10 has sent over a path that is identified by the load balance point 1243 of a record entry in question.

The switching I/O count threshold 1245 indicates a threshold by which the host computer 10 determines to switch paths. When the current I/O count 1244 reaches the switching I/O count threshold 1245, the host computer 10 switches, through round robin, paths over which I/O requests are sent.

FIG. 6 is a configuration diagram of the path state change checking table 125 stored in the host computer 10 according to the first embodiment of this invention.

The path state change checking table 125 contains a path number 1251, a pre-failure detection state 1252, and a post-failure detection state 1253.

The path number 1251 indicates an identifier unique to a path that connects the LU 25 provided by the storage system 20 to the HBA 14 of the host computer 10.

The pre-failure detection state 1252 indicates the state of a path identified by the path number 1251 of a record entry in question before failure detecting processing (path health check). A path can be in one of two states, online or offline. The post-failure detection state 1253 indicates the state of a path identified by the path number 1251 of a record entry in question after failure detecting processing (path health check).

FIG. 7 is a configuration diagram of the LU connection destination host table 321 stored in the management server 30 according to the first embodiment of this invention.

The LU connection destination host table 321 contains an LU number 3211 and a host name 3212.

The LU number 3211 indicates an identifier unique to the LU 25 provided by the storage system 20. The host name 3212 indicates an identifier unique to the host computer 10 that can access the LU 25 identified by the LU number 3211 of a record entry in question.

FIG. 8 is a configuration diagram of the CHA connection destination host table 322 stored in the management server 30 according to the first embodiment of this invention.

The CHA connection destination host table 322 contains an CHA number 3221 and a host name 3222.

The CHA number 3221 indicates an identifier unique to the CHA 21 in the storage system 20. The host name 3222 indicates an identifier unique to the host computer 10 connected to the CHA 21 identified by the CHA number 3221 of a record entry in question.

FIG. 9 is a configuration diagram of the CHA port connection destination host table 323 stored in the management server 30 according to the first embodiment of this invention.

The CHA port connection destination host table 323 contains an CHA port number 3231 and a host name 3232.

The CHA port number 3231 indicates an identifier unique to the CHA port 24 in the storage system 20. The host name 3232 indicates an identifier unique to the host computer 10 that can access the CHA port 24 identified by the CHA port number 3231 of a record entry in question.

FIG. 10 is a configuration diagram of the comprehensive host failure origin table 324 stored in the management server 30 according to the first embodiment of this invention.

The comprehensive host failure origin table 324 contains a failure origin 3241, an information source host name 3242, and a failure date/time 3243.

The failure origin 3241 indicates a site estimated as the cause of a path failure. To be specific, stored as the failure origin 3241 is the identifier of the HBA 14 of the host computer 10, the CHA 21 of the storage system 20, the CHA port 24 in CHA 21 of the storage system 20, the LU 25 provided by the storage system 20, the Fibre Channel switch 40, or a physical path.

The information source host name 3242 indicates an identifier unique to the host computer 10 that has notified the management server 30 of the failure origin 3241 of a record entry in question. The failure date/time 3243 indicates a date and time when a failure recorded in a record entry in question has occurred.

Now, processing of the computer system according to the first embodiment of this invention will be described.

Figure 11:
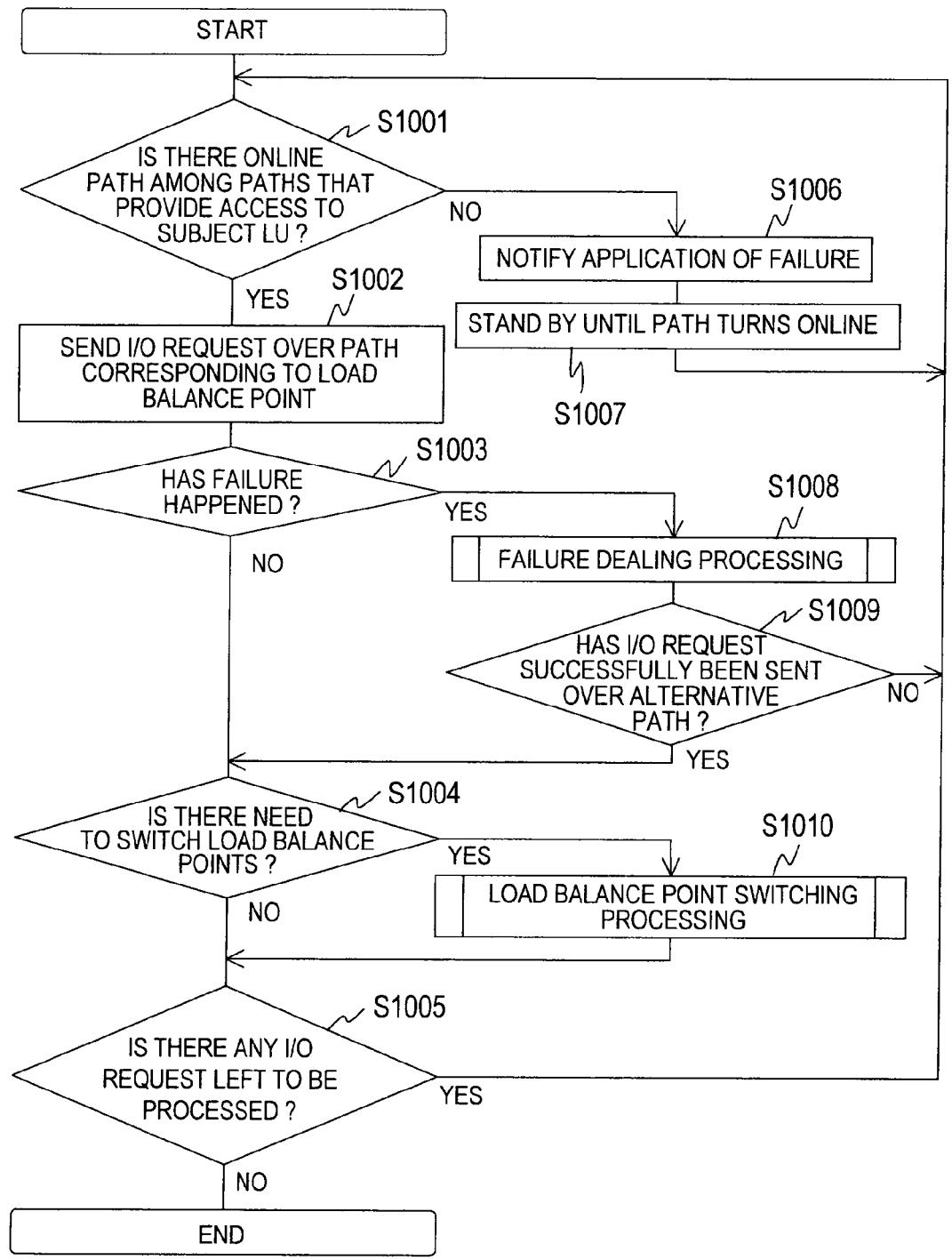
FIG. 11 is a flow chart for load balancing processing, which is executed by the host computer according to the first embodiment of this invention.

FIG. 11 is a flow chart for load balancing processing, which is executed by the host computer 10 according to the first embodiment of this invention.

The host computer 10 executes the load balancing processing when requested by an application to send an I/O request.

First, the host computer 10 identifies which path is connected to the LU 25 to which this I/O request is directed. The host computer 10 then judges whether or not there is an online path among the identified paths (S1001).

To be specific, the host computer 10 selects from the path connection information table 121 every record entry whose LU number 1215 matches the identifier of the LU 25 to which the I/O request is directed. From the chosen record entry, the host computer 10 extracts the path number 1211.

The host computer 10 next selects from the path failure information table 122 a record entry whose path number 1221 matches the extracted path number 1211. From the chosen record entry, the host computer 10 extracts the operation state 1222.

The host computer 10 judges whether or not the extracted operation state 1222 says "online". In the case where at least one extracted operation state 1222 is "online", the host computer 10 judges that there is an online path. On the other hand, in the case where every extracted operation state 1222 says "offline", the host computer 10 judges that there is no online path.

When there is no online path, the host computer 10 cannot send the I/O request. The host computer 10 accordingly notifies the application that has issued the I/O request of a failure (S1006).

Next, the host computer 10 stands by until at least one path for accessing the LU 25 to which the I/O request in question is directed is turned online (S1007). As soon as at least one path for accessing the LU 25 to which the I/O request in question is directed is turned online, the computer 10 returns to Step S1001, where the load balancing processing is repeated.

When there is an online path in Step S1001, the host computer 10 sends the I/O request over a path that is a load balance point (S1002). The host computer 10 thus sends an I/O request over a path selected by round robin.

To be specific, the host computer 10 selects from the load balance point switching table 124 a record entry whose storage name 1242 matches the identifier of the storage system 20 that provides the LU 25 to which the I/O request is directed. The host computer 10 then selects from the chosen record entries of the load balance point switching table 124 one whose LU number 1241 matches the identifier of the LU 25 to which the I/O request is directed. From the thus chosen record entry, the host computer 10 extracts the load balance point 1243.

The host computer 10 sends the I/O request over a path that is identified by the extracted load balance point 1243.

Next, the host computer 10 judges whether or not a failure has occurred in the path used to send the I/O request (S1003).

In the case where a failure has occurred in the path used to send the I/O request, the host computer 10 carries out failure dealing processing (S1008). Details of the failure dealing processing will be described with reference to FIG. 12.

The host computer 10 judges whether or not the I/O request has successfully been sent over an alternative path in the failure dealing processing (S1009).

In the case where transmission of the I/O request over an alternative path has failed, the host computer 10 returns to Step S1001, where the load balancing processing is repeated.

In the case where transmission of the I/O request over an alternative path has been successful in Step S1009, the host computer 10 proceeds to Step S1004. The host computer 10 proceeds to Step S1004 also when Step S1003 finds no failure in the path used to send the I/O request.

The host computer 10 judges whether it is necessary to switch load balance points or not (S1004).

To be specific, the host computer 10 raises the current I/O count 1244 of the load balance point switching table 124 by 1. The host computer 10 then judges whether or not the raised current I/O count 1244 is equal to or larger than the switching I/O count threshold 1245 of the load balance point switching table 124.

In the case where the current I/O count 1244 is smaller than the switching I/O count threshold 1245, the host computer 10 proceeds directly to Step S1005 since there is no need to switch load balance points.

In the case where the current I/O count 1244 is equal to or larger than the switching I/O count threshold 1245, the host computer 10 needs to switch load balance points and therefore carries out load balance point switching processing (S1010). Details of the load balance point switching processing will be described with reference to FIG. 15.

The host computer 10 judges whether or not there is any I/O request left that is requested by an application to be sent (S 005).

In the case where there is an I/O request left to be sent, the host computer 10 returns to Step S1001 in order to process the remaining I/O request. Returning to Step S1001, the host computer 10 performs the load balancing processing on the remaining I/O request.

In the case where no I/O request is left to be sent, the host computer 10 ends the load balancing processing.

Figure 12:
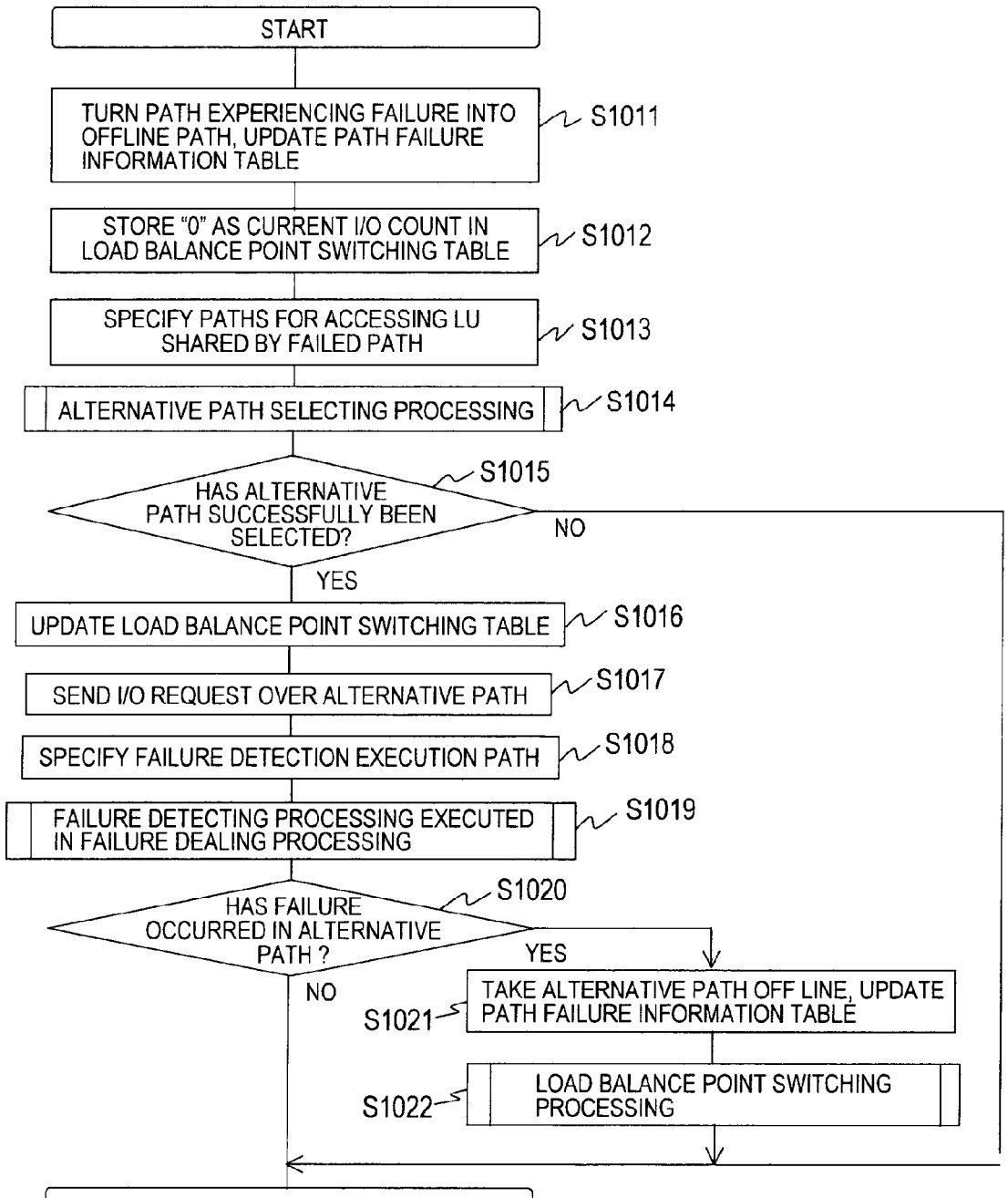
FIG. 12 is a flow chart for failure dealing processing, which is executed by the host computer according to the first embodiment of this invention.

FIG. 12 is a flow chart for failure dealing processing, which is executed by the host computer 10 according to the first embodiment of this invention.

The failure dealing processing is executed in Step S1008 of the load balancing processing shown in FIG. 11.

The host computer 10 first blocks a path where a failure has occurred (takes the path off line). The host computer 10 then updates the path failure information table 122 (S1011).

To be specific, the host computer 10 selects from the path failure information table 122 a record entry whose path number 1221 matches the identifier of the path where the failure has occurred.

As the operation state 1222 of the chosen record entry, the host computer 10 stores "offline". The host computer 10 next raises the failure count 1223 of the chosen record entry by 1. As the failure date/time 1224 of the chosen record entry, the host computer 10 stores the date and time when this path failure is detected. The host computer 10 stores a check mark as the first found failure 1225 of the chosen record entry.

Next, the host computer 10 selects from the load balance point switching table 124 a record entry whose load balance point 1243 matches the identifier of the path where the failure has occurred. As the current I/O count 1244 of the chosen record entry, the host computer 10 stores "0" (S1012).

The host computer 10 then specifies paths for accessing the LU 25 shared by the path where the failure has occurred (S1013).

To be specific, the host computer 10 selects from the path connection information table 121 a record entry whose path number 1211 matches the identifier of the path where the failure has occurred.

The host computer 10 extracts the LU number 1215 from the chosen record entry. The host computer 10 then selects from the path connection information table 121 every record entry whose LU number 1215 matches the extracted LU number 1215. From the thus chosen record entry, the host computer 10 extracts the path number 1211. The host computer 10 then specifies, as a path for accessing the LU 25 shared by the path where the failure has occurred, a path that is identified by the extracted path number 1211.

The host computer 10 performs alternative path selecting processing next (S1014). Through the alternative path selecting processing, the host computer 10 chooses an alternative path out of the specified paths. Details of the alternative path selecting processing will be described with reference to FIG. 13.

The host computer 10 next judges whether or not an alternative path has successfully been chosen in the alternative path selecting processing (S1015).

In the case where the alternative path selecting processing has been unsuccessful, the host computer 10 immediately ends the failure dealing processing since the I/O request cannot be sent over an alternative path.

In the case where an alternative path has successfully been chosen, the host computer 10 updates the load balance point switching table 124 (S1016).

To be specific, the host computer 10 selects from the load balance point switching table 124 a record entry whose load balance point 1243 matches the identifier of the path where the failure has occurred. The host computer 10 stores the identifier of the chosen alternative path as the load balance point 1243 of the chosen record entry. The host computer 10 next raises the current I/O count 1244 by 1.

Then the host computer 10 sends the I/O request over the alternative path chosen in Step S1014 (S1017).

Next, the host computer 10 specifies a failure detection execution path (S1018).

The host computer 10 here specifies paths for accessing the LU 25 shared by the path where the failure has occurred. Out of the identified paths, the host computer 10 picks up online paths and specifies the online paths as failure detection execution paths.

To be specific, the host computer 10 selects from the path connection information table 121 a record entry whose path number 1211 matches the identifier of the path where the failure has occurred.

The host computer 10 extracts the LU number 1215 from the chosen record entry. The host computer 10 then selects from the path connection information table 121 every record entry whose LU number 1215 matches the extracted LU number 1215. From the thus chosen record entry, the host computer 10 extracts the path number 1211. The host computer 10 then specifies, as a path for accessing the LU 25 shared by the path where the failure has occurred, a path that is identified by the extracted path number 1211.

The host computer 10 selects from the path failure information table 122 record entry whose path number 1221 matches the extracted path number 1211. From the chosen record entry, the host computer 10 extracts the operation state 1222. The host computer 10 then judges whether or not the extracted operation state 1222 says "online".

In the case where the extracted operation state 1222 is "online", the host computer 10 specifies, as a failure detection execution path, a path that is identified by the path number 1221 of the chosen record entry.

The host computer 10 executes, for the specified failure detection execution path, a version of failure detecting processing that is carried out during the failure dealing processing (S1019). Details of the failure detecting processing in the failure dealing processing will be described with reference to FIG. 14.

The host computer 10 may specify every path as the failure detection execution path. In this case, the host computer 10 executes, for every path, the version of failure detecting processing that is carried out during the failure dealing processing.

Next, the host computer 10 judges whether or not a failure has occurred in the alternative path upon transmission of the I/O request in Step S1017 (S1020).

In the case where a failure has not occurred in the alternative path, the I/O request has been sent normally. The host computer 10 therefore ends the failure dealing processing at this point.

In the case where a failure has occurred in the alternative path, the host computer 10 blocks the alternative path (takes the alternative path off line). The host computer 10 then updates the path failure information table 122 (S1021).

To be specific, the host computer 10 selects from the path failure information table 122 a record entry whose path number 1221 matches the identifier of the alternative path.

The host computer 10 stores "offline" as the operation state 1222 of the chosen record entry. The host computer 10 then raises the failure count 1223 of the chosen record entry by 1.

As the last failure date/time 1224 of the chosen record entry, the host computer 10 stores the same value as the last failure date/time 1224 of a record entry of the path failure information table 122 whose first found failure 1225 is a check mark.

The host computer 10 next performs load balance point switching processing (S1022). Through the load balance point switching processing, the host computer 10 makes a switch of the load balance point from the alternative path to another path. Details of the load balance point switching processing will be described with reference to FIG. 15.

Thereafter, the host computer 10 ends the failure dealing processing. Finishing the failure dealing processing, the host computer 10 returns to the load balancing processing of FIG. 11. The host computer 10 also performs propagator path blocking processing after the failure dealing processing is ended. Details of the propagator path blocking processing will be described with reference to FIG. 16. In short, the host computer 10 executes the load balancing processing and the propagator path blocking processing in parallel.

Figure 13:
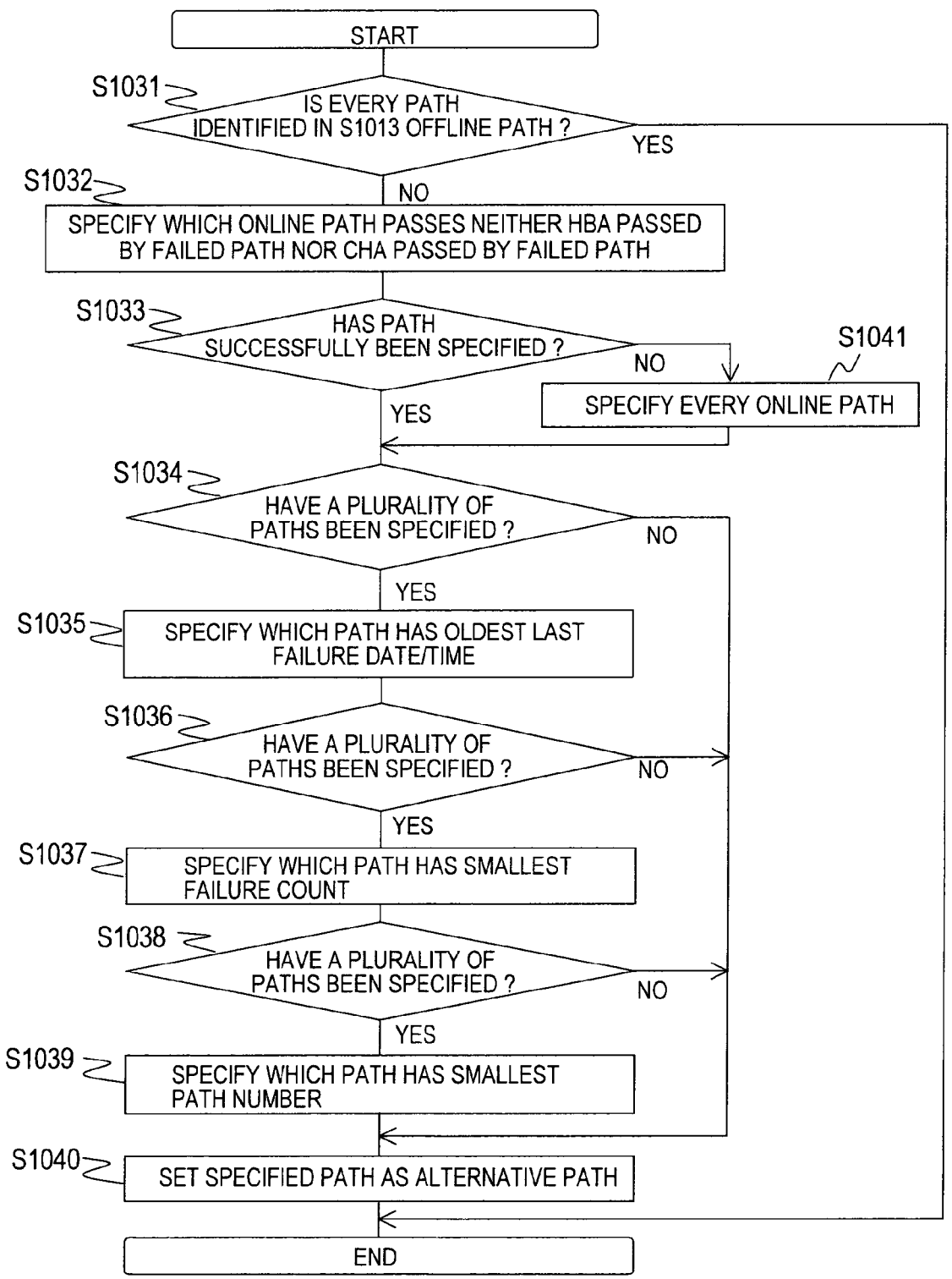
FIG. 13 is a flow chart for alternative path selecting processing, which is executed by the host computer according to the first embodiment of this invention.

FIG. 13 is a flow chart for alternative path selecting processing, which is executed by the host computer 10 according to the first embodiment of this invention.

The alternative path selecting processing is executed in Step S1014 of the failure dealing processing shown in FIG. 12.

The host computer 10 first judges whether or not every path that is identified in Step S1013 of the failure dealing processing is an offline path (S1031).

To be specific, the host computer 10 selects from the path failure information table 122 a record entry whose path number 1221 matches the identifier of the path that is identified in Step S1013 of the failure dealing processing. The host computer 10 judges whether or not "offline" is stored as the operation state 1222 of the chosen record entry. In this manner, the host computer 10 judges whether or not a path identified in Step S1013 of the failure dealing processing is an offline path.

In the case where every identified path is an offline path, the host computer 10 terminates the alternative path selecting processing since no path can be chosen as an alternative path.

In the case where at least one identified path is an online path, the host computer 10 specifies which offline path passes neither the HBA 14 passed by the failed path nor the CHA 23 passed by the failed path (S1032).

To be specific, the host computer 10 selects from the path connection information table 121 a record entry whose path number 1211 matches the identifier of the path where the failure has occurred. From the chosen record entry, the host computer 10 extracts the HBA number 1212 and the CHA number 1213.

The host computer 10 then selects from the path connection information table 121 a record entry whose HBA number 1212 does not match the extracted HBA number 1212. The host computer 10 also selects from the chosen record entries of the path connection information table 121 one whose CHA number 1213 does not match the extracted CHA number 1213. From each of the chosen record entry, the host computer 10 extracts the path number 1211.

The host computer 10 selects from the path failure information table 122 whose path number 1221 matches the extracted path number 1211. From the chosen record entry, the host computer 10 extracts the operation state 1222. The host computer 10 then judges whether or not the extracted operation state 1222 says "online".

In the case where the extracted operation state 1222 is "online", the host computer 10 specifies a path that is identified by the path number 1221 of the chosen record entry as an offline path which passes neither the HBA 14 passed by the failed path nor the CHA 23 passed by the failed path.

Next, the host computer 10 judges whether or not a path has been successfully specified in Step S1032 (S1033).

In the case where a path has successfully been specified in Step S1032, the host computer 10 proceeds directly to Step S1034.

In the case where Step S1032 of specifying a path has been unsuccessful, the host computer 10 specifies every online path (S1041).

To be specific, the host computer 10 selects from the path failure information table 122 a record entry that has "online" as the operation state 1222. From the chosen record entry, the host computer 10 extracts the path number 1221. The host computer 10 specifies, as an online path, a path that is identified by the extracted path number 1221.

Next, the host computer 10 judges whether or not a plurality of paths have been specified in Step S1032 or Step S1041 (S1034).

In the case where only one path has been specified in Step S1032 or Step S1041, the host computer 10 sets the specified path as an alternative path (S1040), and ends the alternative path selecting processing.

In the case where a plurality of paths have been specified in Step S1032 or Step S1041, the host computer 10 determines which one of the specified paths has the oldest last failure date/time (S1035).

To be specific, the host computer 10 selects from the path failure information table 122 a record entry whose path number 1221 matches the identifier of any of the paths specified in Step S1032 or Step S1041. From the chosen record entry, the host computer 10 extracts the last failure date/time 1224. The host computer 10 specifies a path that has the oldest last failure date/time through comparison of the extracted last failure time/date 1224.

Next, the host computer 10 judges whether or not a plurality of paths have been specified in Step S1035 (S1036).

In the case where only one path has been specified in Step S1035, the host computer 10 sets the specified path as an alternative path (S1040), and ends the alternative path selecting processing.

In the case where a plurality of paths have been specified in Step S1035, the host computer 10 determines which one of the specified paths has the least failure count (S1037).

To be specific, the host computer 10 selects from the path failure information table 122 a record entry whose path number 1221 matches the identifier of any of the paths specified in Step S1035. From the chosen record entry, the host computer 10 extracts the failure count 1223. The host computer 10 specifies a path that has the least failure count through comparison of the extracted failure count 1223.

Next, the host computer 10 judges whether or not a plurality of paths have been specified in Step S1037 (S1038).

In the case where only one path has been specified in Step S1037, the host computer 10 sets the specified path as an alternative path (S1040), and ends the alternative path selecting processing.

In the case where a plurality of paths have been specified in Step S1037, the host computer 10 determines which one of the specified paths has the smallest path number (S1039).

To be specific, the host computer 10 specifies a path that has the smallest path number through comparison of the identifier of the paths specified in Step S1037.

The host computer 10 sets as an alternative path the path specified in Step S1039 (S1040), and ends the alternative path selecting processing.

Figure 14:
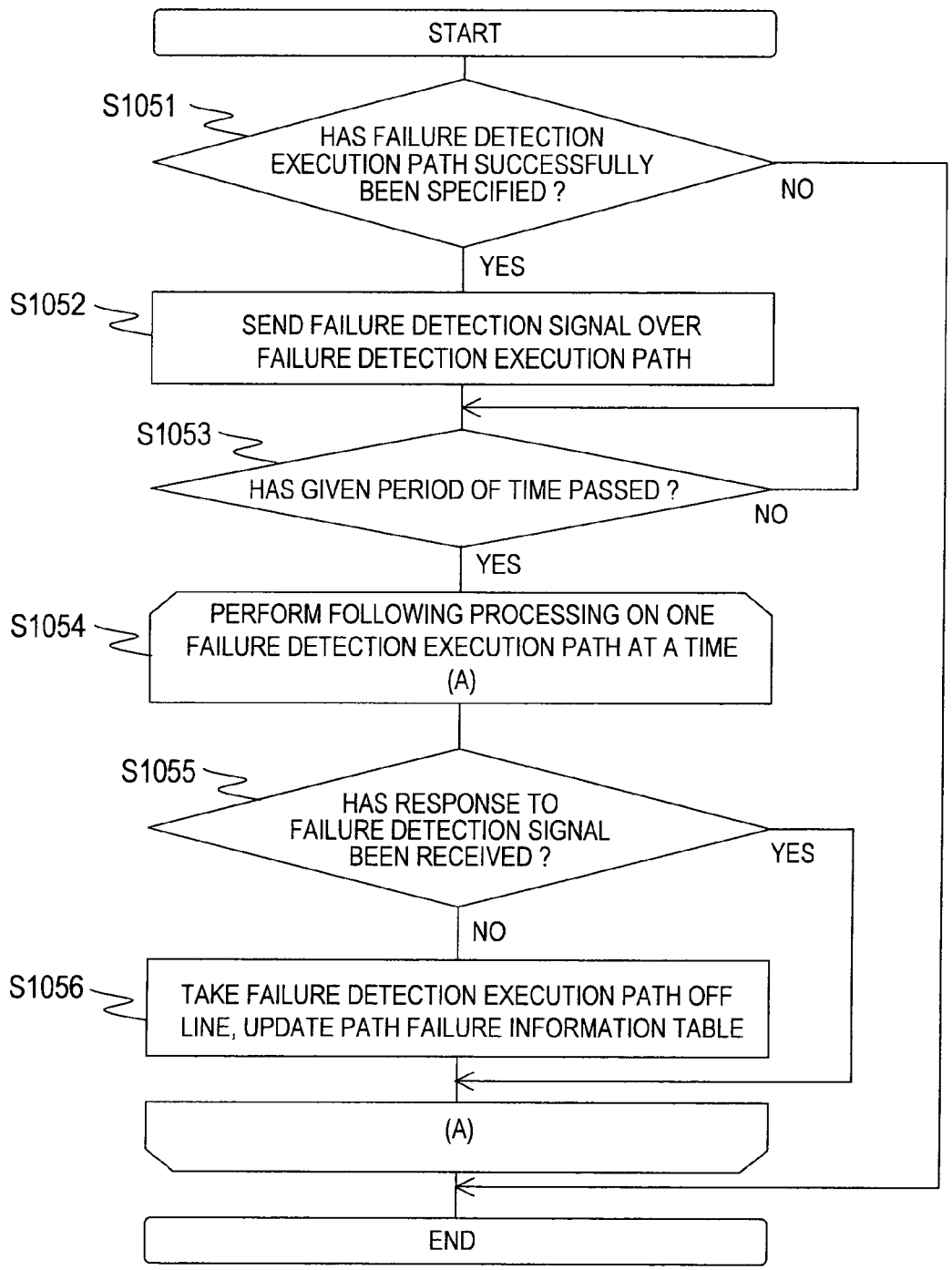
FIG. 14 is a flow chart for a version of failure detecting processing that is executed during the failure dealing processing by the host computer according to the first embodiment of this invention.

FIG. 14 is a flow chart for a version of failure detecting processing that is executed during the failure dealing processing by the host computer 10 according to the first embodiment of this invention.

This version of failure detecting processing is executed in Step S1019 of the failure dealing processing shown in FIG. 12.

The host computer 10 first judges whether or not a failure detection execution path has successfully been specified in Step S1018 of the failure dealing processing (S1051).

In the case where no failure detection execution path has been specified, there is no need for the version of failure detecting processing that is executed in the failure dealing processing, and the host computer 10 immediately terminates this failure detecting processing.

In the case where a failure detection execution path has successfully been specified, the host computer 10 sends a failure detection signal over every specified failure detection execution path (S1052).

The host computer 10 then stands by until a given period of time passes since the transmission of the failure detection signal (S1053).

After the given period of time passes, the host computer 10 sequentially selects the failure detection execution paths in the ascending order of path number. The host computer 10 performs the following processing on a chosen failure detection execution path (S1054).

The host computer 10 judges whether or not a response to the failure detection signal sent over the chosen failure detection execution path has been received (S1055).

Specific processing of the host computer 10 in Step S1055 will be described.

The HBA 14 of the host computer 10 judges whether or not a response to a failure detection signal that is sent over the chosen failure detection execution path has been received. The HBA 14 of the host computer 10 notifies the device link manager 126 of the same host computer 10 of the judgment. Based on the notified judgment, the device link manager 126 of the host computer 10 judges whether or not the host computer 10 has received a response to the failure detection signal.

In the case where a response to the failure detection signal has been received, the host computer 10 judges that the chosen failure detection execution path is normal, and ends the processing for the chosen failure detection execution path.

In the case where a response to the failure detection signal has not been received, the host computer 10 judges that the chosen failure detection execution path is experiencing a failure, and blocks the chosen failure detection execution path (takes the chosen path off line). Then the host computer 10 updates the path failure information table 122 (S1056).

To be specific, the host computer 10 selects from the path failure information table 122 a record entry whose path number 1221 matches the identifier of the failure detection execution path.

The host computer 10 stores "offline" as the operation state 1222 of the chosen record entry. The host computer 10 then raises the failure count 1223 of the chosen record entry by 1. As the last failure date/time 1224 of the chosen record entry, the host computer 10 stores the same value as the last failure date/time 1224 of a record entry of the path failure information table 122 whose first found failure 1225 is a check mark.

Then the host computer 10 ends the processing for the chosen failure detection execution path. The host computer 10 repeats the processing until every failure detection execution path is chosen in Step S1054.

After finishing processing every failure detection execution path, the host computer 10 ends the version of failure detecting processing that is executed in the failure dealing processing.

Figure 15:
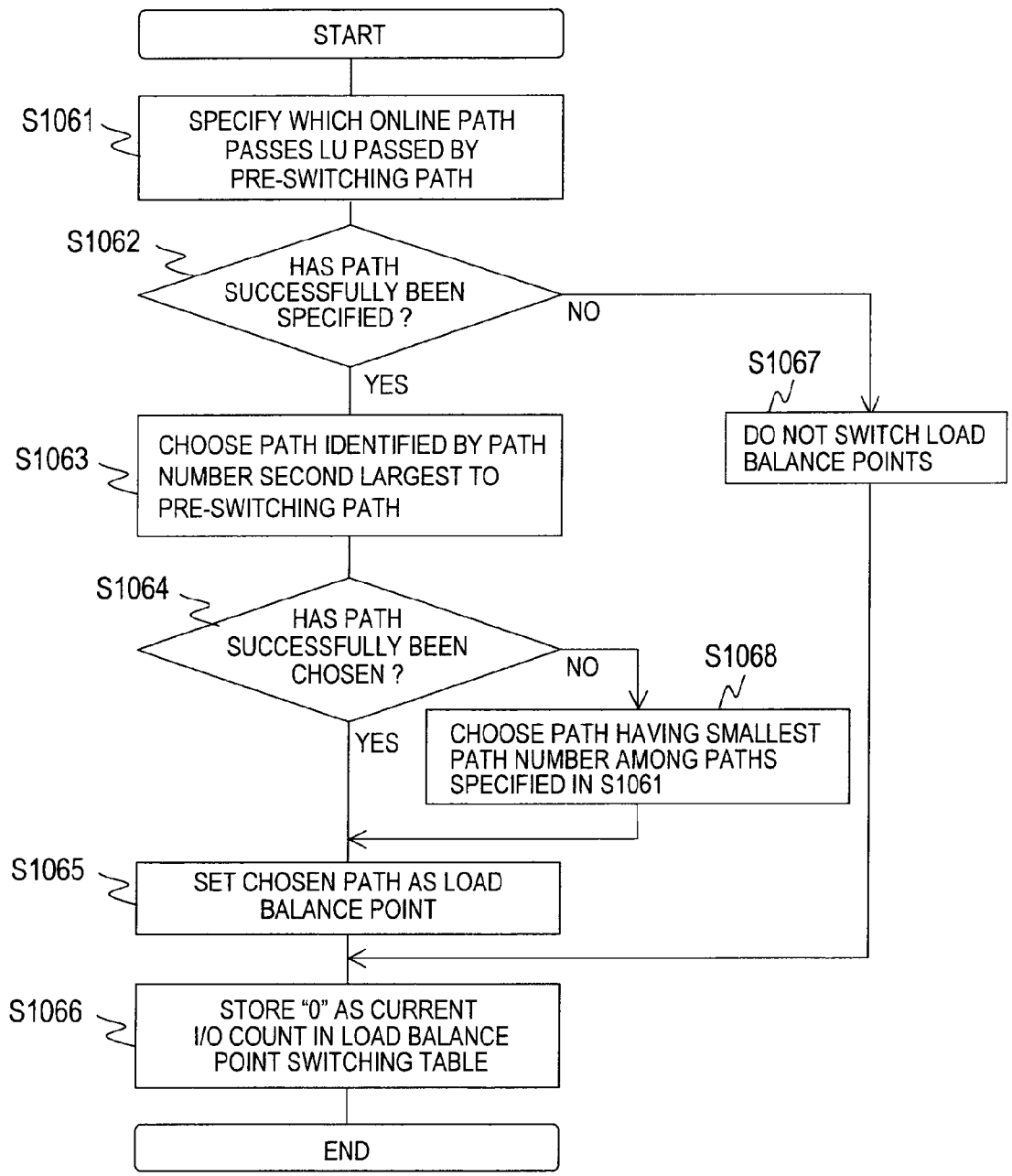
FIG. 15 is a flow chart for load balance point switching processing, which is executed by the host computer according to the first embodiment of this invention.

FIG. 15 is a flow chart for load balance point switching processing, which is executed by the host computer 10 according to the first embodiment of this invention.

The load balance point switching processing is executed in Step S1022 of the failure dealing processing shown in FIG. 12.

The host computer 10 first specifies which path corresponds to a load balance point to be switched from (a pre-switching path). To be specific, the host computer 10 specifies the alternative path as the pre-switching path.

Next, the host computer 10 then identifies a path for accessing the LU 25 shared by the specified pre-switching path where the failure has occurred (S1061).

To be specific, the host computer 10 selects from the path connection information table 121 a record entry whose path number 1211 matches the identifier of the specified pre-switching path.

The host computer 10 extracts the LU number 1215 from the chosen record entry. The host computer 10 then selects from the path connection information table 121 every record entry whose LU number 1215 matches the extracted LU number 1215. From the thus chosen record entry, the host computer 10 extracts the path number 1211. The host computer 10 then specifies, as a path for accessing the LU 25 shared by the pre-switching path, a path that is identified by the extracted path number 1211.

Next, the host computer 10 judges whether or not a path has been successfully specified in Step S1061 (S1062).

In the case where Step S1061 of specifying a path has been unsuccessful, the host computer 10 moves to Step S1066 without switching load balance points (S1067).

In the case where a path has successfully been specified in Step S1061, the host computer 10 chooses, out of the paths specified in Step S1061, one identified by a path number that is largest next to the path number of the pre-switching path (S1063).

Next, the host computer 10 judges whether or not a path has been successfully specified in Step S1063 (S1064).

In the case where a path has successfully been specified in Step S1063, the host computer 10 proceeds directly to Step S1065.

In the case where no path is chosen in Step S1063, the host computer 10 chooses out of the paths specified in Step S1061 one that has the smallest path number (S1068).

The host computer 10 sets the chosen path as a new load balance point (S1065).

To be specific, the host computer 10 selects from the load balance point switching table 124 a record entry whose load balance point 1243 matches the identifier of the pre-switching path. As the load balance point 1243 of the chosen record entry, the host computer 10 stores the identifier of the path that has been chosen in Step S1063 or Step S1068.

The host computer 10 stores "0" as the current I/O count 1244 of the chosen record entry (S1066), and then ends the load balance point switching processing.

Figure 16:
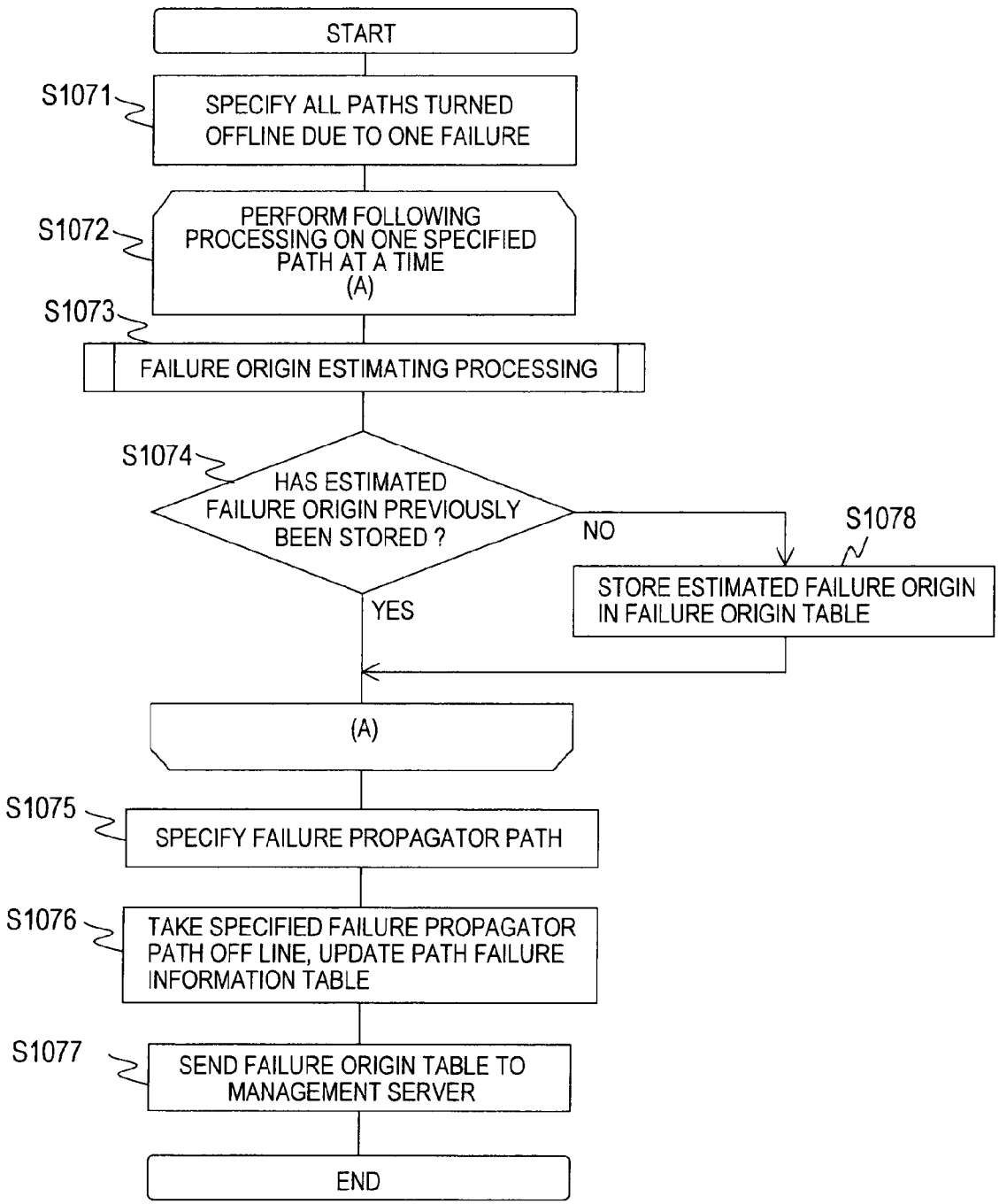
FIG. 16 is a flow chart for propagator path blocking processing, which is executed by the host computer according to the first embodiment of this invention.

FIG. 16 is a flow chart for propagator path blocking processing, which is executed by the host computer 10 according to the first embodiment of this invention.

The host computer 10 first specifies every path that is taken off line by the same failure (S1071).

To be specific, the host computer 10 selects from the path failure information table 122 a record entry that has a check mark as the first found failure 1225. From the chosen record entry, the host computer 10 extracts the last failure date/time 1224.

The host computer 10 next selects from the path failure information table 122 a record entry that has "offline" as the operation state 1222. Out of the chosen record entries of the path failure information table 122, the host computer 10 selects those having the same last failure date/time 1224 as the extracted last failure date/time 1224. From each of the thus selected record entries, the host computer 10 extracts the path number 1221 and specifies, as one of paths taken off line by the same failure, a path that is identified by the extracted path number 1221.

The host computer 10 sequentially selects the paths specified in Step S1071 in the ascending order of path number. The host computer 10 performs the following processing on a chosen path (S1072).

First, the host computer 10 performs failure origin estimating processing on the chosen path (S1073). Through this processing, the host computer 10 estimates the origin of the failure of the chosen path. Details of the failure origin estimating processing will be described with reference to FIG. 17.

Next, the host computer 10 judges whether or not the estimated failure origin has been stored in the failure origin table 123 (S1074).

To be specific, the host computer 10 judges whether or not the failure origin table 123 has a record entry whose failure origin 1231 matches the estimated failure origin.

In the case where the estimated failure origin has already been stored in the failure origin table 123, the host computer 10 ends the processing for the path chosen in Step S1072.

In the case where the estimated failure origin is not found in the failure origin table 123, the host computer 10 stores the estimated failure origin in the failure origin table 123.

To be specific, the host computer 10 creates a new record entry to the failure origin table 123, and stores the estimated failure origin as the failure origin 1231 of the new record entry. As the failure date/time 1232 of the new record entry, the host computer 10 stores the last time failure date/time 1224 that is extracted in Step S1071.

Then the host computer 10 ends the processing for the path chosen in Step S1072. The host computer 10 repeats the processing until every specified path is chosen in Step S1072.

The host computer 10 next specifies a failure propagator path (S1075). Here, the host computer 10 identifies which path passes the estimated failure origin. The host computer 10 then identifies which one of the identified paths provides access to the LU 25 that is not connected to a path where the failure has occurred. Out of the identified paths, the host computer 10 picks up online paths and specifies the online paths as failure propagator paths.

To be specific, the host computer 10 selects from the path connection information table 121 a record entry whose path number 1211 matches the identifier of a path where the failure has occurred. From the chosen record entry, the host computer 10 extracts the LU number 1215.

The host computer 10 selects from the path connection information table 121 a record entry whose HBA number 1212, CHA number 1213, CHA port number 1214 or LU number 1215 matches the identifier of the estimated failure origin.

Out of the chosen record entries of the path connection information table 121, the host computer 10 selects a record entry whose LU number 1215 does not match the extracted LU number 1215. The host computer 10 extracts the path number 1211 from the chosen record entry.

The host computer 10 selects from the path failure information table 122 whose path number 1221 matches the extracted path number 1211. From the chosen record entry, the host computer 10 extracts the operation state 1222. The host computer 10 then judges whether or not the extracted operation state 1222 says "online".

In the case where the extracted operation state 1222 is "online", the host computer 10 specifies, as a failure propagator path, a path that is identified by the path number 1221 of the chosen record entry.

Next, the host computer 10 blocks the specified failure propagator path (takes the path off line). The host computer 10 then updates the path failure information table 122 (S1076).

To be specific, the host computer 10 selects from the path failure information table 122 a record entry whose path number 1221 matches the identifier of the blocked failure propagator path. The host computer 10 stores "offline" as the operation state 1222 of the chosen record entry. The host computer 10 then raises the failure count 1223 of the chosen record entry by 1. As the last failure date/time 1224 of the chosen record entry, the host computer 10 stores the last failure date/time 1224 extracted in Step S1072.

Next, the host computer 10 sends the failure origin table 123 to the management server 30 (S1077), and ends the propagator path blocking processing.

On receiving the failure origin table 123, the management server 30 executes failure origin confirming processing. Details of the failure origin confirming processing will be described with reference to FIG. 18.

Figure 17:
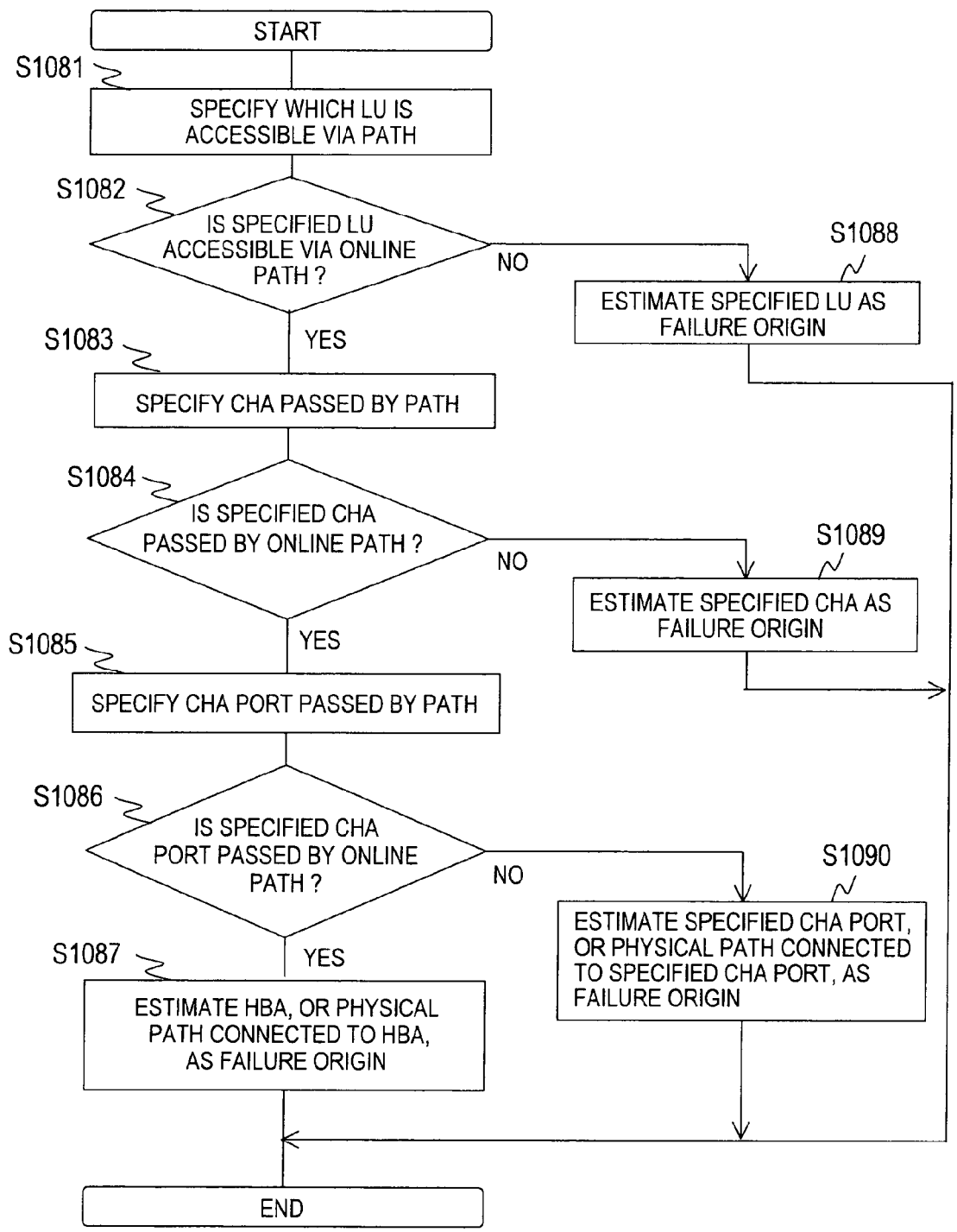
FIG. 17 is a flow chart for failure origin estimating processing, which is executed by the host computer according to the first embodiment of this invention.

FIG. 17 is a flow chart for failure origin estimating processing, which is executed by the host computer 10 according to the first embodiment of this invention.

Figure 22:
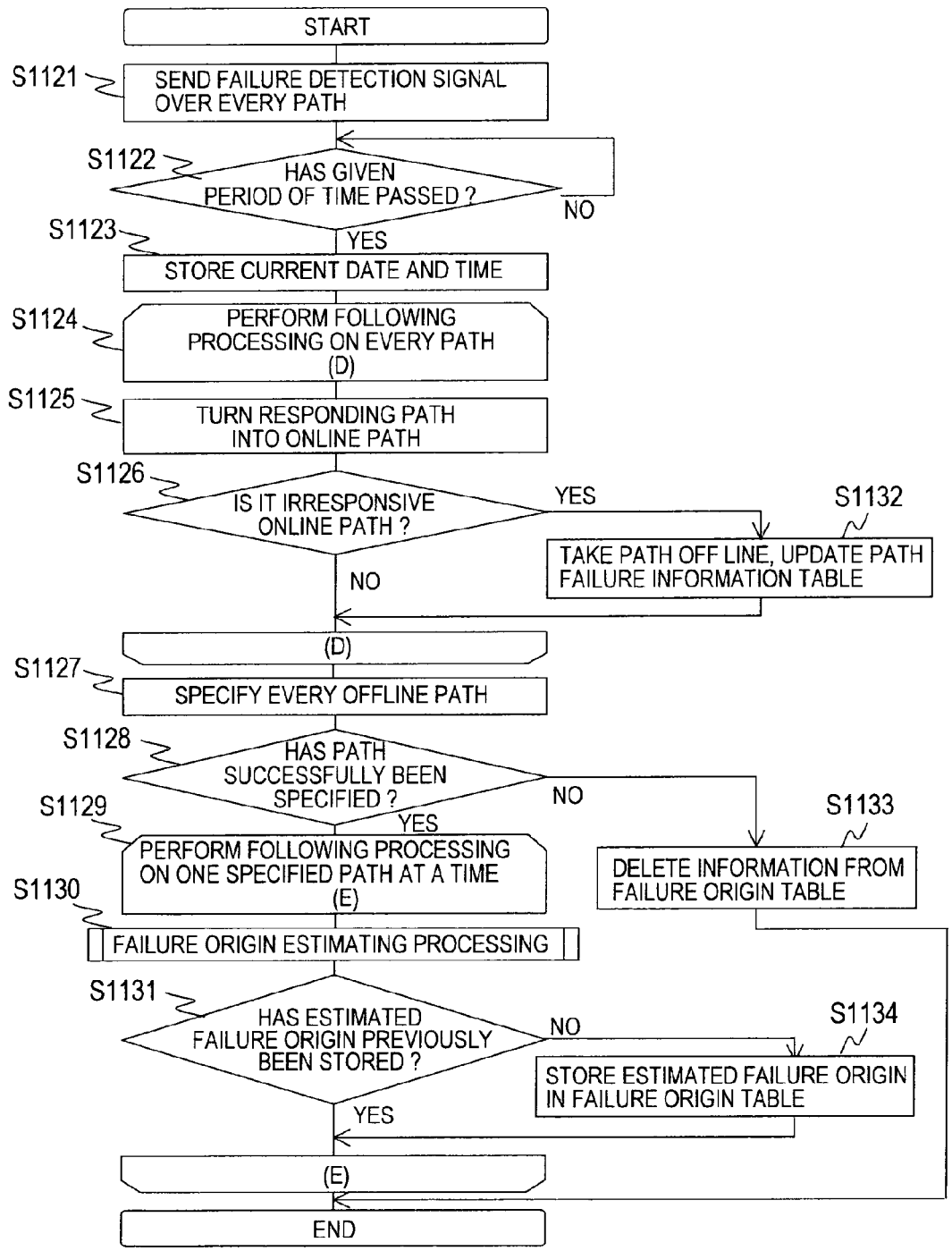
FIG. 22 is a flow chart for all-path failure detecting processing, which is executed by the host computer according to the first embodiment of this invention.

The failure origin estimating processing is executed in Step S1073 of the propagator path blocking processing shown in FIG. 16, or in Step S1130 of all-path failure detecting processing shown in FIG. 22.

The host computer 10 identifies which LU 25 is accessible through a path chosen in Step S1072 of the propagator path blocking processing or in Step S1129 of the all-path failure detecting processing (S1081).

To be specific, the host computer 10 selects from the path connection information table 121 a record entry whose path number 1211 matches the identifier of the chosen path. From the chosen record entry, the host computer 10 extracts the LU number 1215. The host computer 10 specifies, as the LU 25 that is accessible through the chosen path, the LU 25 identified by the extracted LU number 1215.

The host computer 10 next judges whether or not the LU 25 specified in Step S1081 is accessible through an online path (S1082).

To be specific, the host computer 10 selects from the path connection information table 121 a record entry whose LU number 1215 matches the extracted LU number 1215. From the chosen record entry, the host computer 10 extracts the path number 1211.

The host computer 10 selects from the path failure information table 122 a record entry whose path number 1221 matches the extracted path number 1211. From the chosen record entry, the host computer 10 extracts the operation state 1222.

The host computer 10 then judges whether or not the extracted operation state 1222 says "online". In the case where at least one extracted operation state 1222 is "online", the host computer 10 judges that an online path passes the specified LU 25. In the case where every extracted operation state 1222 says "offline", the host computer 10 judges that the specified LU 25 is not accessible through an online path.

When the specified LU 25 is not accessible through an online path, the host computer 10 surmises that the specified LU 25 is the origin of the failure (S1088).

On the other hand, when the specified LU 25 is accessible through an online path, the host computer 10 surmises that the specified LU 25 is not the origin of the failure.

The host computer 10 identifies the CHA 21 passed by a path chosen in Step S1072 of the propagator path blocking processing or in Step S1129 of the all-path failure detecting processing (S1083).

To be specific, the host computer 10 selects from the path connection information table 121 a record entry whose path number 1211 matches the identifier of the chosen path. From the chosen record entry, the host computer 10 extracts the CHA number 1213. The host computer 10 specifies, as the CHA 21 passed by the chosen path, the CHA 21 identified by the extracted CHA number 1213.

The host computer 10 next judges whether or not an online path passes the CHA 21 specified in Step S1083 (S1084).

To be specific, the host computer 10 selects from the path connection information table 121 a record entry whose CHA number 1213 matches the extracted CHA number 1213. From the chosen record entry, the host computer 10 extracts the path number 1211.

The host computer 10 selects from the path failure information table 122 a record entry whose path number 1221 matches the extracted path number 1211. From the chosen record entry, the host computer 10 extracts the operation state 1222.

The host computer 10 then judges whether or not the extracted operation state 1222 says "online". In the case where at least one extracted operation state 1222 is "online", the host computer 10 judges that an online path passes the specified CHA 21. In the case where every extracted operation state 1222 says "offline", the host computer 10 judges that an online path does not pass the specified CHA 21.

When an online path does not pass the specified CHA 21, the host computer 10 surmises that the specified CHA 21 is the origin of the failure (S1089).

On the other hand, when an online path passes through the specified CHA 21, the host computer 10 surmises that the specified CHA 21 is not the origin of the failure.

The host computer 10 identifies the CHA port 24 passed by a path chosen in Step S1072 of the propagator path blocking processing or in Step S1129 of the all-path failure detecting processing (S1085).

To be specific, the host computer 10 selects from the path connection information table 121 a record entry whose path number 1211 matches the identifier of the chosen path. From the chosen record entry, the host computer 10 extracts the CHA port number 1214. The host computer 10 specifies, as the CHA port 24 passed by the chosen path, the CHA port 24 identified by the extracted CHA port number 1214.

The host computer 10 next judges whether or not an online path passes the CHA port 24 specified in Step S1085 (S1086).

To be specific, the host computer 10 selects from the path connection information table 121 every record entry whose CHA port number 1214 matches the extracted CHA port number 1214. From the chosen record entry, the host computer 10 extracts the path number 1211.

The host computer 10 selects from the path failure information table 122 a record entry whose path number 1221 matches the extracted path number 1211. From the chosen record entry, the host computer 10 extracts the operation state 1222.

The host computer 10 then judges whether or not the extracted operation state 1222 says "online". In the case where at least one extracted operation state 1222 is "online", the host computer 10 judges that an online path passes the specified CHA port 24. In the case where every extracted operation state 1222 says "offline", the host computer 10 judges that an online path does not pass the specified CHA port 24.

When an online path does not pass the specified CHA port 24, the host computer 10 surmises that the specified CHA port 24 or a physical path connected to the specified CHA port 24 is the origin of the failure (S1090).

On the other hand, when an online path passes the specified CHA port 24, the host computer 10 surmises that the specified CHA port 24 is not the origin of the failure.

The host computer 10 identifies the HBA 14 passed by a path chosen in Step S1072 of the propagator path blocking processing or in Step S1129 of the all-path failure detecting processing.

To be specific, the host computer 10 selects from the path connection information table 121 a record entry whose path number 1211 matches the identifier of the chosen path. From the chosen record entry, the host computer 10 extracts the HBA number 1212. The host computer 10 specifies, as the HBA 14 passed by the chosen path, the HBA 14 identified by the extracted HBA number 1212.

The host computer 10 surmises that the specified HBA 14, or the physical path connected to the specified HBA 14, is the origin of the failure (S1087).

Then the host computer 10 ends the failure origin estimating processing.

Figure 18:
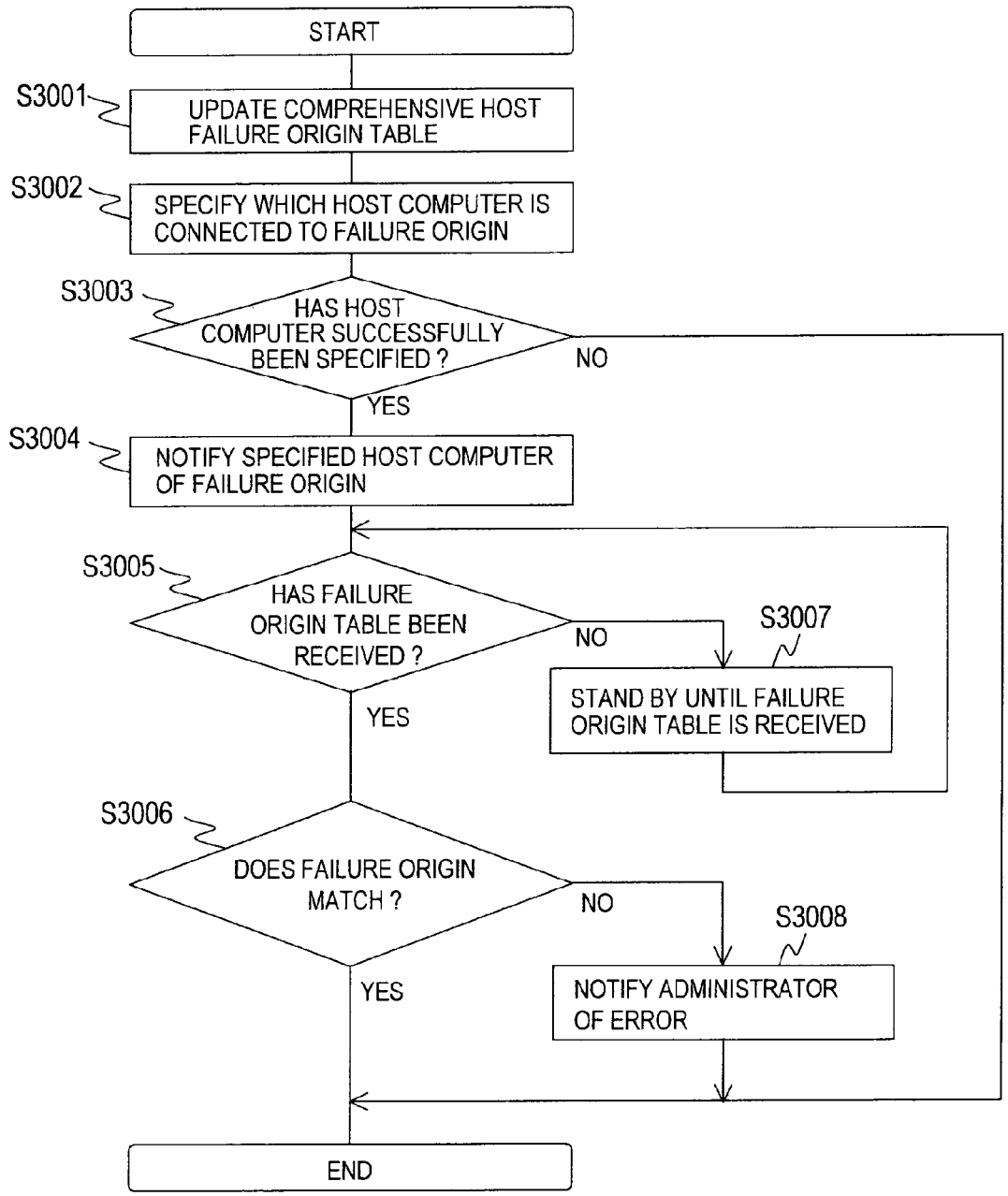
FIG. 18 is a flow chart for failure origin confirming processing, which is executed by the management server according to the first embodiment of this invention.

FIG. 18 is a flow chart for failure origin confirming processing, which is executed by the management server 30 according to the first embodiment of this invention.

The management server 30 carries out the failure origin confirming processing upon reception of the failure origin table 123 from the host computer 10.

First, the management server 30 updates the comprehensive host failure origin table 324 by referring to the received failure origin table 123 (S3001).

To be specific, the management server 30 stores the failure origin 1231 of the received failure origin table 123 as the failure origin 3241 of the comprehensive host failure origin table 324. As the information source host name 3242 of the comprehensive host failure origin table 324, the management server 30 stores the identifier of the host computer 10 that has sent the received failure origin table 123. The management server 30 stores the failure date/time 1232 of the received failure origin table 123 as the failure date/time 3243 of the comprehensive host failure origin table 324.

Next, the management server 30 identifies which host computer 10 is connected to this failure origin, excluding the host computer 10 that has sent the failure origin table 123 (S3002).

To be specific, the management server 30 chooses, as a table corresponding to the failure origin, the LU connection destination host table 321, the CHA connection destination host table 322 or the CHA port connection destination host table 323. The management server 30 identifies the host computer 10 that is connected to the failure origin by referring to the chosen table.

To give an example, a case in which the CHA 21 is the origin of a failure will be described.

In this case, the management server 30 selects from the CHA connection destination host table 322 a record entry whose CHA number 3221 matches the identifier of the failure origin CHA 21. From the chosen record entry, the management server 30 extracts the host name 3222. The management server 30 specifies, as the host computer 10 that is connected to the failure origin, the host computer identified by the extracted host name 3222.

The management server 30 next judges whether or not the host computer 10 has successfully been specified in Step S3002 (S3003).

In the case where no host computer 10 has been specified, the management server 30 judges that the failure will not affect other host computers 10, and ends the failure origin confirming processing here.

In the case where the host computer 10 has successfully been specified, the management server 30 notifies the specified host computer 10 of the failure origin (S3004). Notified of the failure origin by the management server 30, the host computer 10 performs a version of failure dealing processing that is executed upon notification from the management server 30. Details of the management server-prompted failure dealing processing will be described with reference to FIG. 19.

The management server 30 next judges whether or not the failure origin table 123 has been received from every host computer 10 that has been notified of the failure origin (S3005).

In the case where there is the host computer 10 that has been notified of the failure origin but has not sent the failure origin table 123, the management server 30 stands by until the failure origin table 123 is received from every host computer 10 that has been notified of the failure origin (S3007).

When every host computer 10 that has been notified of the failure origin finishes submitting the failure origin table 123, the management server 30 judges whether or not the failure origin 3241 of the comprehensive host failure origin table 324 matches the failure origin 1231 of the received failure origin table 123 (S3006).

In the case where the failure origin 3241 matches the failure origin 1231, the management server 30 judges that the failure origin 3241 of the comprehensive host failure origin table 324 is correct, and ends the failure origin confirming processing here.

In the case where the failure origin 3241 does not match the failure origin 1231, the management server 30 judges that the failure origin 3241 of the comprehensive host failure origin table 324 is incorrect, and notifies an administrator of the computer system of the error (S3008). Notified of the error, the administrator judges that the Fibre Channel switch 40 is the failure origin, or that there are two or more failure origins. The management server 30 may notify the administrator of the fact that the Fibre Channel switch 40 is the failure origin, or that there are two or more failure origins, instead of simply informing the administrator that error has occurred.

The management server 30 then ends the failure origin confirming processing.

Figure 19:
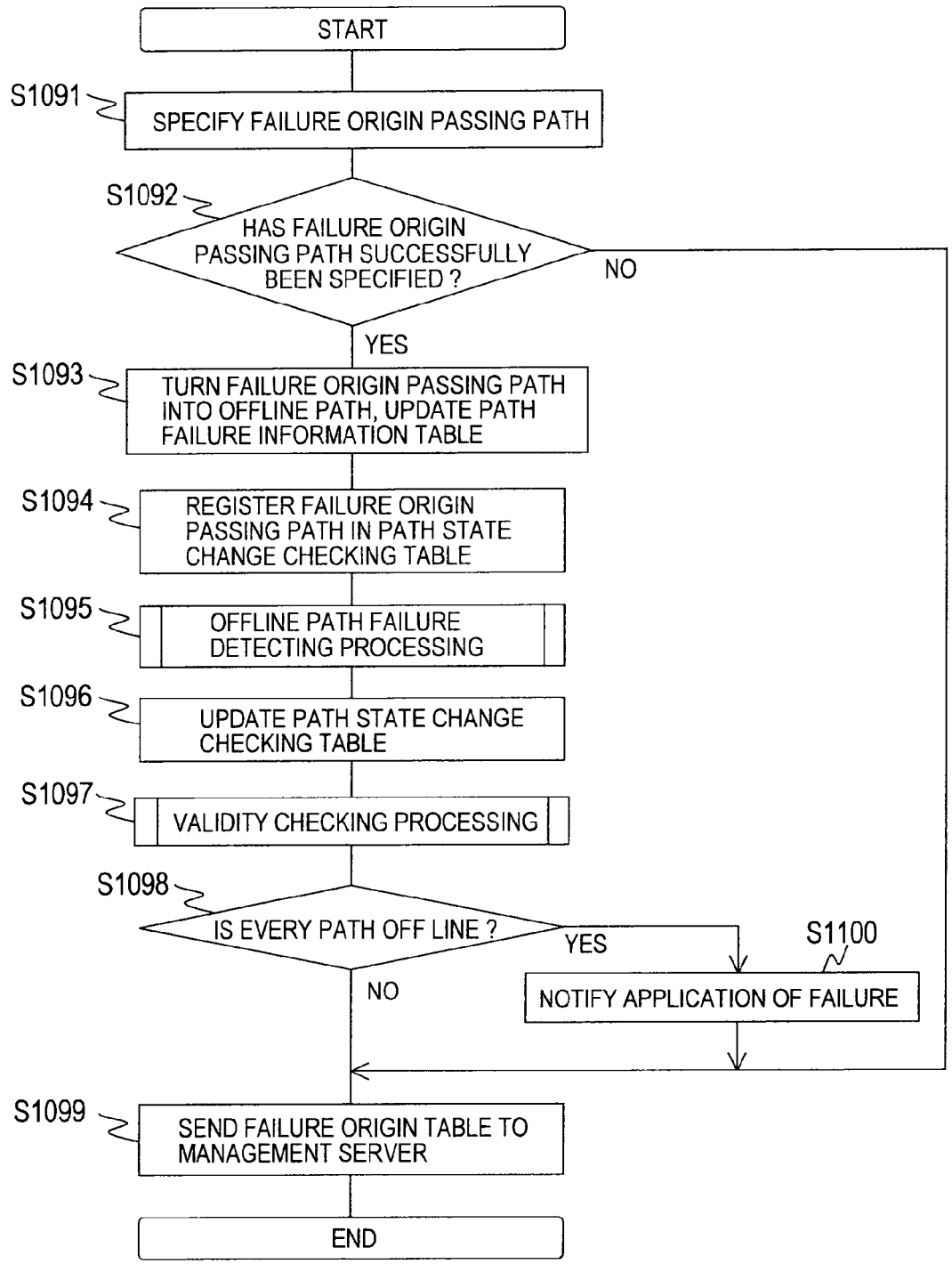
FIG. 19 is a flow chart for management server-prompted failure dealing processing, which is executed by the host computer according to the first embodiment of this invention.

FIG. 19 is a flow chart for management server-prompted failure dealing processing, which is executed by the host computer 10 according to the first embodiment of this invention.

Upon notified of a failure origin by the management server 30, the host computer 10 carries out the management server-prompted failure dealing processing. The management server 30 notifies the host computer 10 of a failure origin in Step S3004 of the failure origin confirming processing shown in FIG. 18.

The host computer 10 first specifies a failure origin passing path by referring to the path connection information table 121 and the path failure information table 122 (S1091). Here, the host computer 10 specifies paths that pass the notified failure origin. Out of the specified paths, the host computer 10 picks up online paths and specifies the an online path as a failure origin passing path.

To be specific, the host computer 10 selects from the path connection information table 121 a record entry whose HBA number 1212, CHA number 1213, CHA port number 1214 or LU number 1215 matches the identifier of the notified failure origin.

From the chosen record entry, the host computer 10 extracts the path number 1211.

The host computer 10 selects from the path failure information table 122 a record entry whose path number 1221 matches the extracted path number 1211. From the chosen record entry, the host computer 10 extracts the operation state 1222. The host computer 10 then judges whether or not the extracted operation state 1222 says "online".

In the case where the extracted operation state 1222 is "online", the host computer 10 specifies, as a failure detection execution path, a path that is identified by the path number 1221 of the chosen record entry.

The host computer 10 next judges whether or not a failure origin passing path has successfully been specified in Step S1091 (S1092).

In the case where no failure origin passing path has been specified, the host computer 10 judges that the notified failure origin does not affect any paths, and proceeds directly to Step S1099.

In the case where a failure origin passing path has been specified, the host computer 10 blocks the specified failure origin passing path (takes the path off line). The host computer 10 then updates the path failure information table 122 (S1093).

To be specific, the host computer 10 selects from the path failure information table 122 a record entry whose path number 1221 matches the identifier of the specified failure origin passing path. The host computer 10 stores "offline" as the operation state 1222 of the chosen record entry.

The host computer 10 next registers the specified failure origin passing path in the path state change checking table 125 (S1094). In the case where information has previously been stored in the path state change checking table 125, the host computer 10 deletes every piece of the stored information from the path state change checking table 125. Thereafter, the host computer 10 registers the specified failure origin passing path in the path state change checking table 125.

To be specific, the host computer 10 stores the identifier of the specified failure origin passing path as the path number 1251 in the path state change checking table 125. As the pre-failure detection state 1252 of the path state change checking table 125, the host computer 10 stores "offline".

The host computer 10 then performs offline path failure detecting processing (S1095). Details of the offline path failure detecting processing will be described with reference to FIG. 20.

The host computer 10 next updates the path state change checking table 125 (S1096).

To be specific, the host computer 10 selects record entries of the path state change checking table 125 one by one starting from the top of the table and proceeding downward. The host computer 10 performs the following processing on a chosen record entry.

The host computer 10 extracts the path number 1251 from the chosen record entry. Then the host computer 10 selects from the path failure information table 122 a record entry whose path number 1221 matches the extracted path number 1251.

From the chosen record entry, the host computer 10 extracts the operation state 1222. The host computer 10 stores the extracted operation state 1222 as the post-failure detection state 1253 of the record entry chosen from the path state change checking table 125.

The host computer 10 repeats this processing to thereby update the path state change checking table 125.

Next, the host computer 10 executes validity checking processing (S1097). Through this processing, the host computer 10 judges the validity of a failure origin notified by the management server 30. Details of the validity checking processing will be described with reference to FIG. 21.

Then whether every path connected to this host computer 10 is an offline path or not is judged by the host computer 10 (S1098).

To be specific, the host computer 10 judges whether or not "online" is stored as the operation state 1222 in the path failure information table 122. When at least one record entry of the path failure information table 122 stores "online" as the operation state 1222, the host computer 10 judges that at least one of the paths connected to itself is an online path. When none of record entries of the path failure information table 122 stores "online" as the operation state 1222, the host computer 10 judges that every path connected to itself is an offline path.

In the case where there is at least one online path connected, the host computer 10 proceeds directly to Step S1099.

In the case where every connected path is an offline path, the host computer 10 notifies an application of a failure (S1100).

The host computer 10 then sends the updated failure origin table 123 to the management server 30 (S1099), and ends the management server-prompted failure dealing processing.

Figure 20:
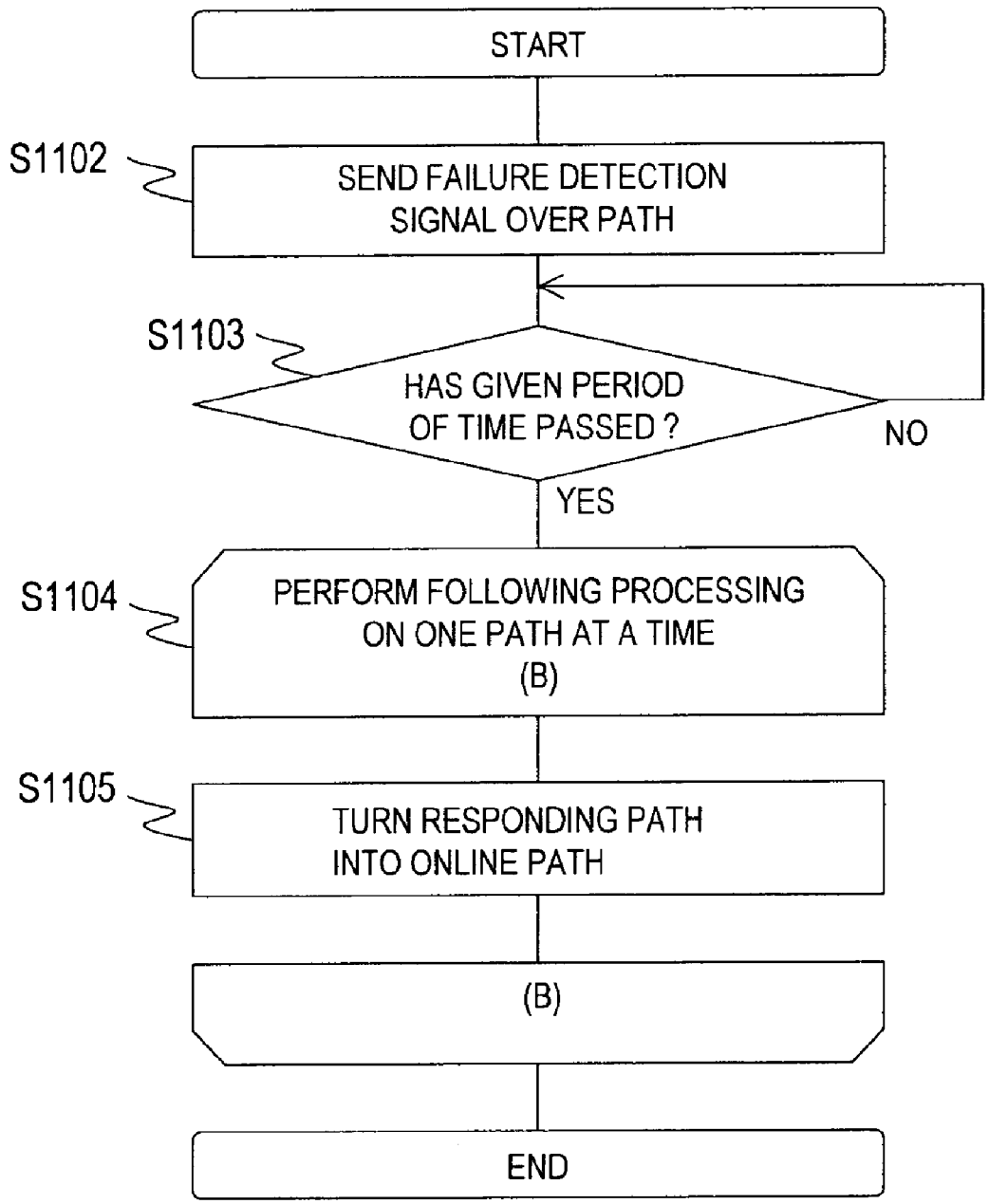
FIG. 20 is a flow chart for offline path failure detecting processing, which is executed by the host computer according to the first embodiment of this invention.

FIG. 20 is a flow chart for offline path failure detecting processing, which is executed by the host computer 10 according to the first embodiment of this invention.

The offline path failure detecting processing is executed in Step S1095 of the management server-prompted failure dealing processing shown in FIG. 19. An offline path in this step is a failure origin passing path.

Figure 23:
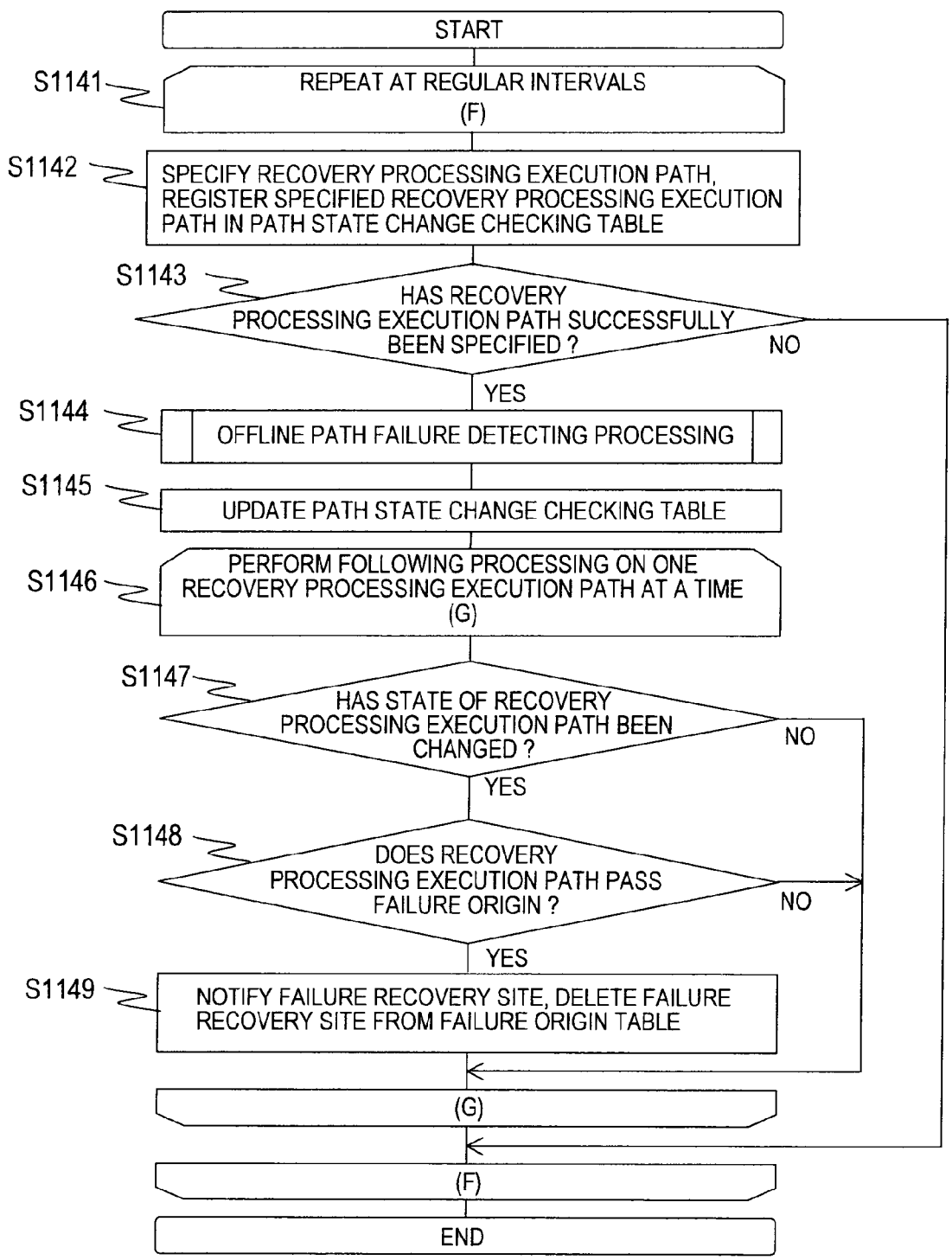
FIG. 23 is a flow chart for path failure recovery processing, which is executed by the host computer according to the first embodiment of this invention.

The offline path failure detecting processing is also executed in Step S1144 of path failure recovery processing shown in FIG. 23. An offline path in this step is a recovery processing execution path.

Figure 25:
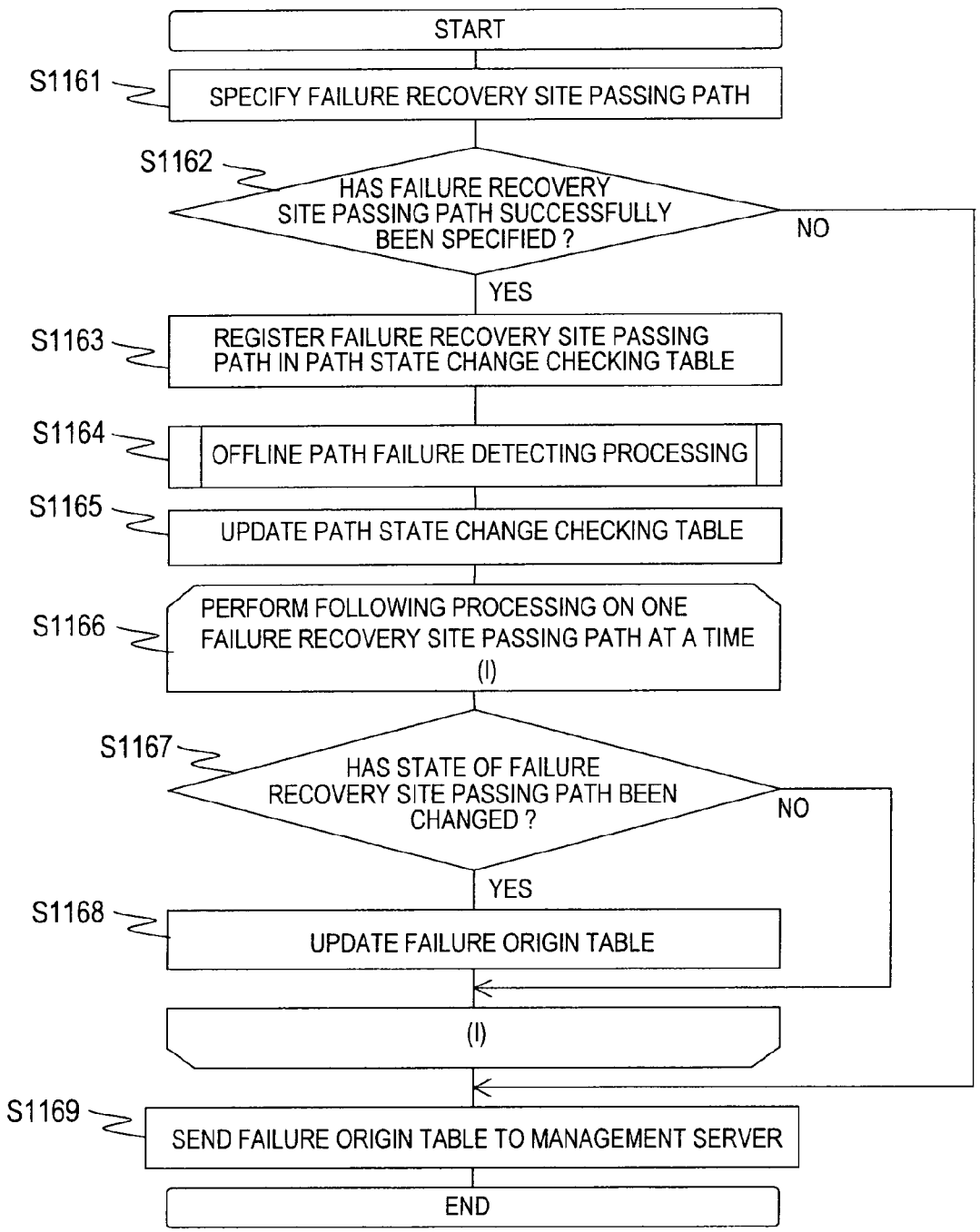
FIG. 25 is a flow chart for management server-prompted failure recovery processing, which is executed by the host computer according to the first embodiment of this invention.

The offline path failure detecting processing is executed in Step S1164 of the management server-prompted failure recovery processing shown in FIG. 25. An offline path in this step is a failure recovery passing path.

First, the host computer 10 sends a failure detecting signal over an offline path (S1102).

When the offline path is a failure origin passing path, the host computer 10 sends a failure detecting signal over every failure origin passing path that is specified in Step S1091 of the management server-prompted failure dealing processing.

On the other hand, when the offline path is a recovery processing passing path, the host computer 10 sends a failure detecting signal over every recovery processing execution path that is specified in Step S1142 of the path failure recovery processing.

When the offline path is a failure recovery site passing path, the host computer 10 sends a failure detecting signal over every failure recovery site passing path that is specified in Step S1161 of the management server-prompted failure recovery processing.

The host computer 10 stands by until a given period of time passes since the transmission of the failure detecting signal (S1103).

After the given period of time passes, the host computer 10 sequentially chooses offline paths in the ascending order of path number. The host computer 10 performs the following processing on a chosen offline path (S1104).

The host computer 10 judges whether or not a response to the failure detection signal that is sent over the chosen offline path has been received.

In the case where a response to the failure detection signal has been received, the host computer 10 judges that the chosen offline path is normal. The host computer 10 therefore turns the chosen offline path into an online path (S1105), and updates the path failure information table 122 accordingly.

To be specific, the host computer 10 selects from the path failure information table 122 a record entry whose path number 1221 matches the identifier of the chosen offline path. The host computer 10 stores "online" as the operation state 1222 of the chosen record entry, and ends the processing for the chosen offline path.

In the case where a response to the failure detection signal has not been received, the host computer 10 judges that the chosen offline path is experiencing a failure, and keeps the chosen offline path in an offline state.

Then the host computer 10 ends the processing for the chosen offline path. The host computer 10 repeats the processing until every offline path is chosen.

After finishing processing every offline path, the host computer 10 ends the offline path failure detecting processing.

Figure 21:
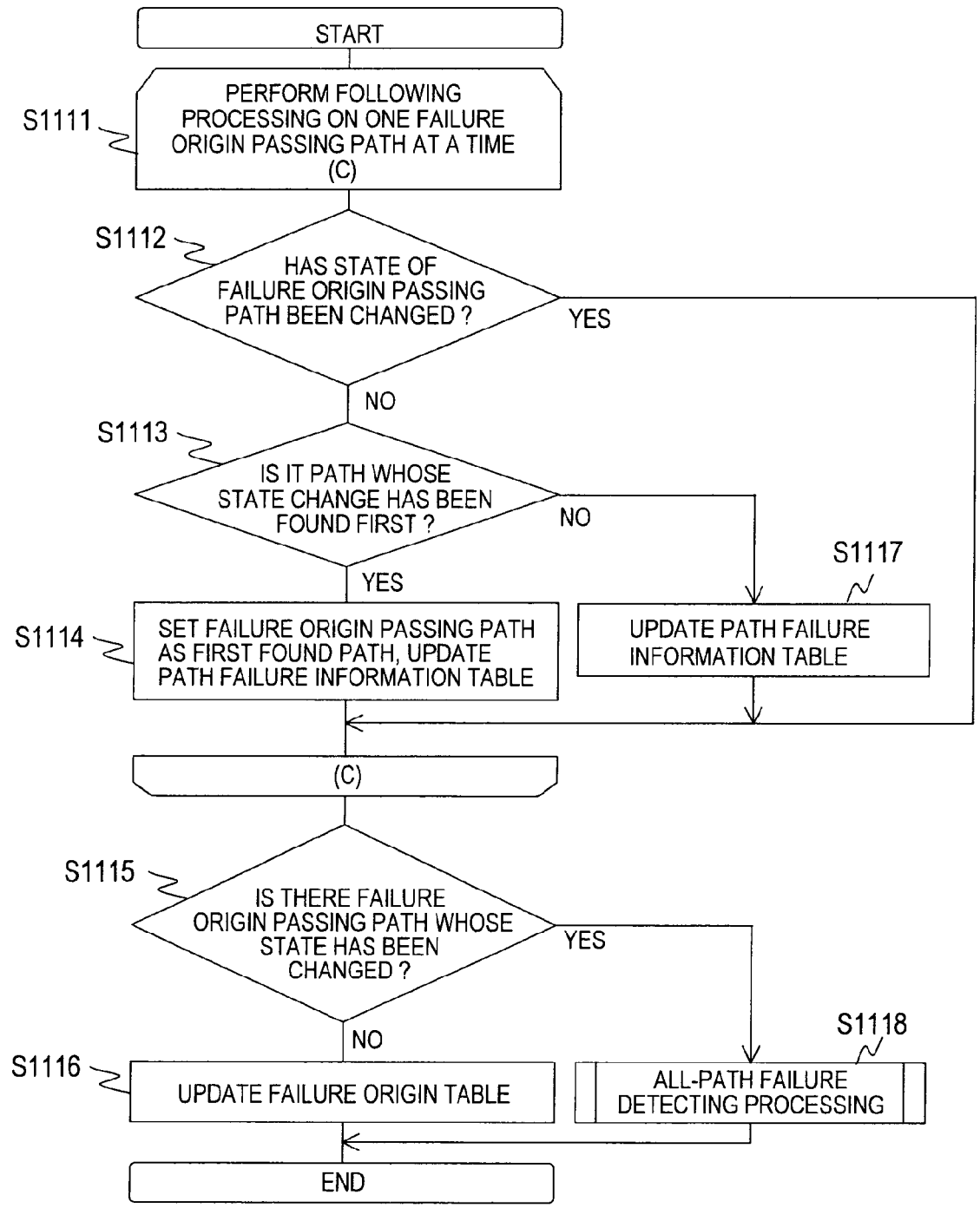
FIG. 21 is a flow chart for validity checking processing, which is executed by the host computer according to the first embodiment of this invention.

FIG. 21 is a flow chart for validity checking processing, which is executed by the host computer 10 according to the first embodiment of this invention.

The validity checking processing is executed in Step S1097 of the management server-prompted failure dealing processing shown in FIG. 19.

The host computer 10 sequentially selects failure origin passing paths in the ascending order of path number. The host computer 10 performs the following processing on a chosen failure origin passing path (S1111).

First, the host computer 10 judges whether or not the state of the chosen failure origin passing path has been changed before and after the failure detecting processing of FIG. 20 by referring to the path state change checking table 125 (S1112).

To be specific, the host computer 10 selects from the path state change checking table 125 a record entry whose path number 1251 matches the identifier of the failure origin passing path chosen. The host computer 10 judges whether or not "offline" is stored as the pre-failure detection state 1252 and post-failure detection state 1253 of the chosen record entry.

In the case where "online" is stored as the post-failure detection state 1253, the host computer 10 judges that the state of the chosen failure origin passing path has been changed. This failure origin passing path has changed from offline to online.

Accordingly, there is no need for the host computer 10 to update the path failure information table 122. The host computer 10 ends the processing for this failure origin passing path chosen.

In the case where "offline" is stored as the pre-failure detection state 1252 and as the post-failure detection state 1253 both, the host computer 10 judges that the state of the chosen failure origin passing path has not been changed. This failure origin passing path remains off line.

Accordingly, the host computer 10 needs to update the path failure information table 122. To this end, the host computer 10 judges whether or not the chosen failure origin passing path is a path whose state change has been detected first in the current validity checking processing (S1113).

In the case where the chosen failure origin passing path is a path whose state change has been detected first, the host computer 10 sets the chosen failure origin passing path as a first found path. The host computer 10 then updates the path failure information table 122 (S1114).

To be specific, the host computer 10 selects from the path failure information table 122 a record entry whose path number 1221 matches the identifier of the failure origin passing path chosen. The host computer 10 raises the failure count 1223 of the chosen record entry by 1. As the last failure date/time of the chosen record entry, the host computer 10 stores the current date and time.

The host computer 10 stores a check mark as the first found failure 1225 of the chosen record entry. In the case where a check mark has previously been stored as the first found failure 1225 of another record entry, the host computer 10 deletes this check mark before storing a check mark as the first found failure 1225 of the chosen record entry.

Then the host computer 10 ends the processing for the chosen failure origin passing path.

In the case where the failure origin passing path chosen is not a path whose state change has been detected first, the host computer 10 updates the path failure information table 122 (S1117).

To be specific, the host computer 10 selects from the path failure information table 122 a record entry whose path number 1221 matches the identifier of the chosen failure origin passing path.

The host computer 10 then raises the failure count 1223 of the chosen record entry by 1. As the last failure date/time 1224 of the chosen record entry, the host computer 10 stores the same value as the last failure date/time 1224 of a record entry of the path failure information table 122 whose first found failure 1225 stores a check mark.

Then the host computer 10 ends the processing for the chosen failure origin passing path.

The host computer 10 next judges whether or not there is a failure origin passing path the state of which has been changed before and after the failure detecting processing of FIG. 20 (S1115).

To be specific, the host computer 10 judges whether or not "offline" is stored as the pre-failure detection state 1252 and the post-failure detection state 1253 of every record entry in the path state change checking table 125.

In the case where "offline" is stored as the pre-failure detection state 1252 and the post-failure detection state 1253 both in every record entry, the host computer 10 judges that there is no failure origin passing path whose state has been changed. In the case where at least one record entry stores "online" as the pre-failure detection state 1252 and the post-failure detection state 1253, the host computer 10 judges that there is a failure origin passing path whose state has been changed.

When there is a failure origin passing path the state of which has been changed, the host computer 10 updates the failure origin table 123 (S1116).

To be specific, the host computer 10 adds a new record entry to the failure origin table 123. The host computer 10 stores, as the failure origin 1231 of the new record entry, the failure origin that has been notified in Step S1901 of the management server-prompted failure dealing processing shown in FIG. 19. Then the host computer 10 ends the validity checking processing.

On the other hand, in the case where there is no failure origin passing path the state of which has been changed, the host computer 10 executes all-path failure detecting processing (S1118). Details of the all-path failure detecting processing will be described with reference to FIG. 22. Then the host computer 10 ends the validity checking processing.

FIG. 22 is a flow chart for all-path failure detecting processing, which is executed by the host computer 10 according to the first embodiment of this invention.

The all-path failure detecting processing is executed in Step S1118 of the validity checking processing shown in FIG. 21.

First, the host computer 10 sends a failure detection signal over every path (S1121).

The host computer 10 stands by until a given period of time passes since the transmission of the failure detection signal (S1122).

After the given period of time passes, the host computer 10 stores the current date and time (S1123).

Then the host computer 10 sequentially selects all paths in the ascending order of path number. The host computer 10 performs the following processing on a chosen path (S1124).

The host computer 10 judges whether or not a response to the failure detection signal that is sent over the chosen path has been received.

In the case where a response to the failure detection signal has been received, the host computer 10 judges that the chosen path is normal. The host computer 10 therefore turns the chosen path into an online path (S1125), and updates the path failure information table 122 accordingly.

To be specific, the host computer 10 selects from the path failure information table 122 a record entry whose path number 1221 matches the identifier of the chosen path. The host computer 10 stores "online" as the operation state 1222 of the chosen record entry, and ends the processing for the chosen path.

In the case where a response to the failure detection signal has not been received, the host computer 10 judges that the chosen path is experiencing a failure. The host computer 10 then judges whether or not the chosen path is an online path (S1126).

To be specific, the host computer 10 selects from the path failure information table 122 a record entry whose path number 1221 matches the identifier of the chosen path. The host computer 10 judges whether or not "online" is stored as the operation state 1222 of the chosen record entry.

In the case where the chosen path is an offline path, the host computer 10 ends the processing for the chosen path.

In the case where the chosen path is an online path, the host computer 10 blocks the chosen path (takes the path off line). The host computer 10 then updates the path failure information table 122 (S1132).

To be specific, the host computer 10 selects from the path failure information table 122 a record entry whose path number 1221 matches the identifier of the chosen path.

The host computer 10 stores "offline" as the operation state 1222 of the chosen record entry. The host computer 10 raises the failure count 1223 of the chosen record entry by 1. As the last failure date/time 1224 of the chosen record entry, the host computer 10 enters the date and time that have been stored in Step S1123.

Then the host computer 10 ends the processing for the chosen path. The host computer 10 repeats the processing until every path is chosen in Step S1124.

Next, the host computer 10 specifies every offline path by referring to the path failure information table 122 (S1127).

To be specific, the host computer 10 next selects from the path failure information table 122 every record entry that stores "offline" as the operation state 1222. From each of the thus selected record entries, the host computer 10 extracts the path number 1221 and specifies, as an offline path taken off line by the same failure, a path that is identified by the extracted path number 1221.

The host computer 10 then judges whether or not an offline path has successfully been specified in Step S1127 (S1128).

In the case where no offline path has been specified, the host computer 10 judges that there is no path experiencing a failure. The host computer 10 therefore deletes the information stored in the failure origin table 123 (S1133), and ends the all-path failure detecting processing.

In the case where an offline path has been specified, the host computer 10 sequentially selects the specified offline paths in the ascending order of path number. The host computer 10 performs the following processing on a chosen offline path (S1129).

The host computer 10 first performs the failure origin estimating processing of FIG. 17 on the chosen offline path (S1130). Through this processing, the host computer 10 estimates the failure origin of the offline path chosen.

Next, the host computer 10 judges whether or not the estimated failure origin has been stored in the failure origin table 123 (S1131).

To be specific, the host computer 10 judges whether or not the failure origin table 123 has a record entry whose failure origin 1231 matches the estimated failure origin.

In the case where the estimated failure origin has already been stored in the failure origin table 123, the host computer 10 ends the processing for the offline path chosen in Step S1129.

In the case where the estimated failure origin is not found in the failure origin table 123, the host computer 10 stores the estimated failure origin in the failure origin table 123.

To be specific, the host computer 10 creates a new record entry to the failure origin table 123, and stores the estimated failure origin as the failure origin 1231 of the new record entry. As the failure date/time 1232 of the new record entry, the host computer 10 enters the date and time that have been stored in Step S1123.

Then the host computer 10 ends the processing for the offline path chosen in Step S1129. The host computer 10 repeats the processing until every offline path is chosen in Step S1129.

After finishing processing every offline path, the host computer 10 ends the all-path failure detecting processing.

FIG. 23 is a flow chart for path failure recovery processing, which is executed by the host computer 10 according to the first embodiment of this invention.

The host computer 10 repeats the path failure recovery processing at regular intervals (S141).

First, the host computer 10 specifies every offline path as a recovery processing execution path by referring to the path failure information table 122. The host computer 10 registers the specified recovery processing execution path in the path state change checking table 125 (S1142).

To be specific, the host computer 10 selects from the path failure information table 122 every record entry that stores "offline" as the operation state 1222. From the chosen record entry, the host computer 10 extracts the path number 1221. The host computer 10 specifies, as a recovery processing execution path, a path that is identified by the extracted path number 1221.

The host computer 10 stores the extracted path number 1221 as the path number 1251 of the path state change checking table 125. As the pre-failure detection state 1252 of the path state change checking table 125, the host computer 10 stores "offline".

In the case where the path state change checking table 125 holds previous information, the host computer 10 deletes every piece of the stored information from the path state change checking table 125. Thereafter, the host computer 10 registers the specified recovery processing execution path in the path state change checking table 125.

The host computer 10 next judges whether or not a recovery processing execution path has successfully been specified in Step S1142 (S1143).

In the case where no recovery processing execution path has been specified, the host computer 10 judges that every path is an online path, and ends the path failure recovery processing here.

In the case where a recovery processing execution path has been specified, the host computer 10 performs the offline path failure detecting processing of FIG. 20 (S1144).

The host computer 10 then updates the path state change checking table 125 (S1145).

To be specific, the host computer 10 selects record entries of the path state change checking table 125 one by one starting from the top of the table and proceeding downward. The host computer 10 performs the following processing on a chosen record entry.

The host computer 10 extracts the path number 1251 from the chosen record entry. Then the host computer 10 selects from the path failure information table 122 a record entry whose path number 1221 matches the extracted path number 1251.

From the chosen record entry, the host computer 10 extracts the operation state 1222. The host computer 10 stores the extracted operation state 1222 as the post-failure detection state 1253 of the record entry chosen from the path state change checking table 125.

The host computer 10 repeats this processing to thereby update the path state change checking table 125.

Next, the host computer 10 sequentially selects specified recovery processing execution paths in the ascending order of path number. The host computer 10 performs the following processing on a chosen recovery processing execution path (S1146).

The host computer 10 first judges whether or not the state of the chosen recovery processing execution path has been changed before and after the failure detecting processing of FIG. 20 by referring to the path state change checking table 125 (S1147).

To be specific, the host computer 10 selects from the path state change checking table 125 a record entry whose path number 1251 matches the identifier of the recovery processing execution path chosen. The host computer 10 judges whether or not "offline" is stored as the pre-failure detection state 1252 and post-failure detection state 1253 of the chosen record entry.

In the case where "offline" is stored as the pre-failure detection state 1252 and the post-failure detection state 1253 both, the host computer 10 judges that the state of the chosen recovery processing execution path has not been changed, and ends the processing for this recovery processing execution path.

In the case where "online" is stored as the post-failure detection state 1253, the host computer 10 judges that the state of the chosen recovery processing execution path has changed from offline to online. In other words, the host computer 10 judges that the chosen recovery processing execution path has recovered from a failure.

When this is the case, the host computer 10 judges whether or not the chosen recovery processing execution path passes a failure origin (S1148). In other words, the host computer 10 judges whether or not the recovery processing execution path that has recovered from a failure passes a failure origin.

To be specific, the host computer 10 selects from the path connection information table 121 a record entry whose path number 1211 matches the identifier of the recovery processing execution path chosen. From the chosen record entry, the host computer 10 extracts the HBA number 1212, the CHA number 1213, the CHA port number 1214, and the LU number 1215.

The host computer 10 selects from the failure origin table 123 a record entry whose failure origin 1231 matches at least one of the extracted HBA number 1212, CHA number 1213, CHA port number 1214, and LU number 1215.

In the case where there is no record entry that meets the condition, the host computer 10 judges that the recovery processing execution path that has recovered from a failure does not pass a failure origin, and ends the processing for this recovery processing execution path.

In the case where there is a record entry that meets the condition, the host computer 10 judges that the failure origin passed by this recovery processing execution path has recovered from the failure. To be specific, the host computer 10 judges that the failure origin 1231 of the chosen record entry has recovered from the failure.

The host computer 10 then notifies the failure origin 1231 of the chosen record entry as a failure recovery site to the management server 30. Notified of the failure recovery site, the management server 30 performs failure recovery confirming processing. Details of the failure recovery confirming processing will be described with reference to FIG. 24.

Then the host computer 10 deletes the chosen record entry from the failure origin table 123. The host computer 10 thus deletes information on the failure recovery site from the failure origin table 123 (S1149).

Thereafter, the host computer 10 ends the processing for the recovery processing execution path chosen in Step S1146. The host computer 10 repeats the processing until every recovery processing execution path is chosen in Step S1146.

After finishing processing every recovery processing execution path, the host computer 10 ends the path failure recovery processing.

Figure 24:
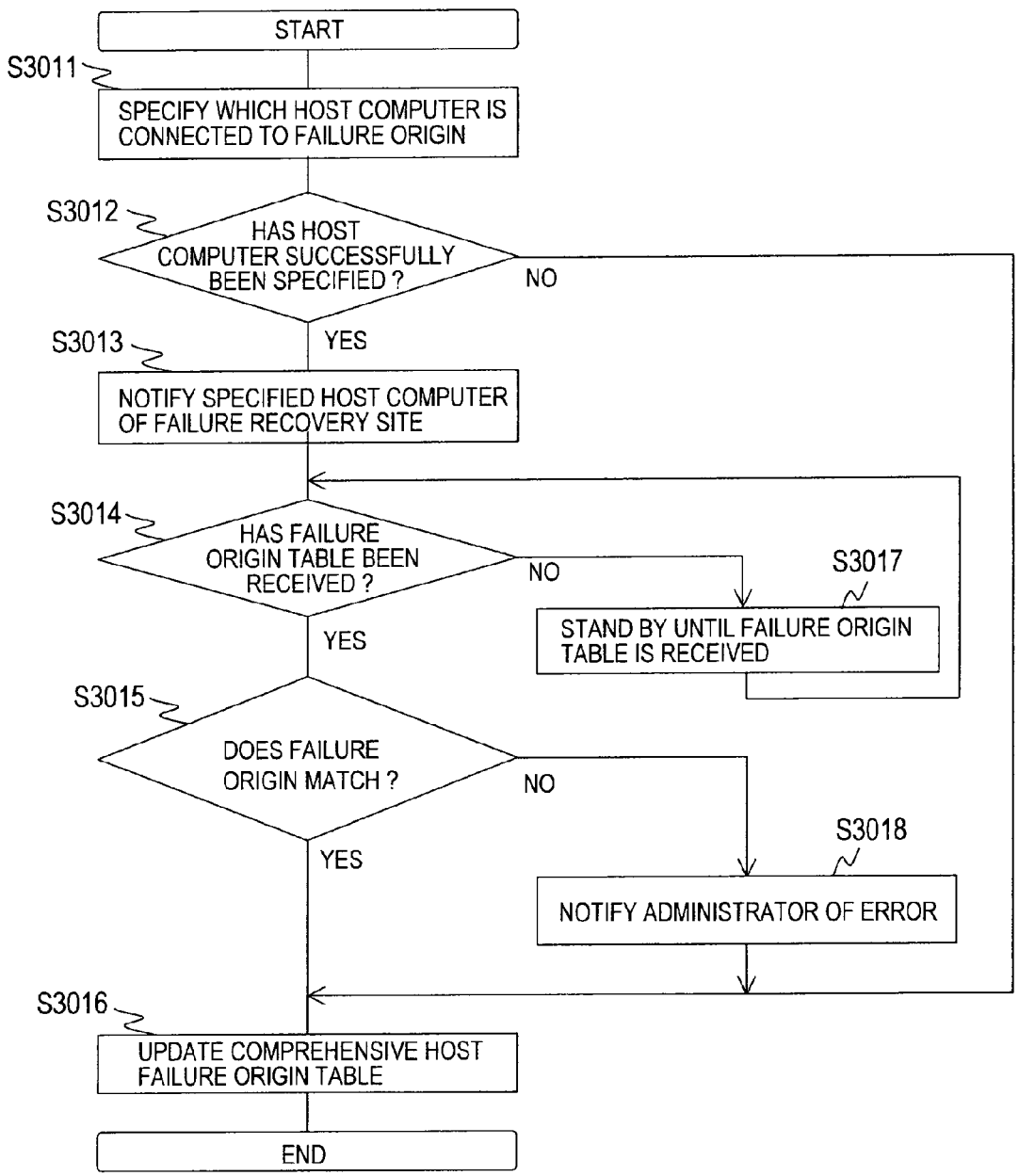
FIG. 24 is a flow chart for failure recovery confirming processing, which is executed by the management server according to the first embodiment of this invention.

FIG. 24 is a flow chart for failure recovery confirming processing, which is executed by the management server 30 according to the first embodiment of this invention.

The management server 30 executes the failure recovery confirming processing when notified of a failure recovery site by the host computer 10.

First, the management server 30 identifies which host computer 10 is connected to the notified failure recovery site, excluding the host computer 10 that has notified the failure recovery site (S3011).

To be specific, the management server 30 chooses a table corresponding to the failure recovery site, from the LU connection destination host table 321, the CHA connection destination host table 322, and the CHA port connection destination host table 323. The management server 30 identifies the host computer 10 that is connected to the failure recovery site by referring to the chosen table.

For example, a case in which the CHA 21 is the failure recovery site will be described.

In this case, the management server 30 selects from the CHA connection destination host table 322 a record entry whose CHA number 3221 matches the identifier of the failure recovery site CHA 21. From the chosen record entry, the management server 30 extracts the host name 3222. The management server 30 specifies, as the host computer 10 that is connected to the failure recovery site, the host computer 10 identified by the extracted host name 3222.

The management server 30 next judges whether or not the host computer 10 has successfully been specified in Step S3011 (S3012).

In the case where no host computer 10 has been specified, the management server 30 judges that the failure recovery will not affect other host computers 10, and proceeds directly to Step S3016.

In the case where the host computer 10 has been specified, the management server 30 notifies the specified host computer 10 of the failure recovery site (S3013). Notified of the failure recovery site by the management server 30, the host computer 10 performs a version of failure recovering processing that is executed upon notification from the management server 30. Details of the management server-prompted failure recovering processing will be described with reference to FIG. 25.

The management server 30 next judges whether or not the failure origin table 123 has been received from every host computer 10 that has been notified of the failure recovery site (S3014).

In the case where there is the host computer 10 that has been notified of the failure recovery site but has not sent the failure origin table 123, the management server 30 stands by until the failure origin table 123 is received from every host computer 10 that has been notified of the failure recovery site (S3017).

When every host computer 10 that has been notified of the failure recovery site finishes submitting the failure origin table 123, the management server 30 judges whether or not the failure origin 3241 of the comprehensive host failure origin table 324 matches the failure origin 1231 of the received failure origin table 123 (S3015).

In the case where the failure origin 3241 matches the failure origin 1231, the management server 30 judges that the notified failure recovery site is correct, and proceeds directly to Step S3016.

In the case where the failure origin 3241 does not match the failure origin 1231, the management server 30 judges that the notified failure recovery site is incorrect, and notifies an administrator of the computer system of the error (S3018). Notified of the error, the administrator judges that the Fibre Channel Switch 40 is the failure recovery site, or that there are two or more failure recovery sites. The management server 30 may notify the administrator of the fact that the Fibre Channel Switch 40 is the failure recovery site, or that there are two or more failure recovery sites, instead of simply informing the administrator that error has occurred.

The management server 30 next updates the comprehensive host failure origin table 324 (S3016).

To be specific, the management server 30 deletes from the comprehensive host failure origin table 324 a record entry whose failure origin 3241 matches the identifier of the notified failure recovery site.

Then the management server 30 ends the failure recovery confirming processing.

FIG. 25 is a flow chart for management server-prompted failure recovery processing, which is executed by the host computer 10 according to the first embodiment of this invention.

The host computer 10 carries out the management server-prompted failure recovery processing when notified of a failure recovery site by the management server 30. The management server 30 notifies the host computer 10 of a failure recovery site in Step S3013 of the failure recovery confirming processing shown in FIG. 24.

First, the host computer 10 specifies a failure recovery site passing path by referring to the path connection information table 121 and the path failure information table 122 (S1161). The host computer 10 here specifies a path that passes the notified failure recovery site. Out of the specified paths, the host computer 10 picks up offline paths and specifies the offline paths as failure recovery site passing paths.

To be specific, the host computer 10 selects from the path connection information table 121 a record entry whose HBA number 1212, CHA number 1213, CHA port number 1214, or LU number 1215 matches the identifier of the notified failure recovery site. From the chosen record entry, the host computer 10 extracts the path number 1211.

The host computer 10 selects from the path failure information table 122 a record entry whose path number 1221 matches the extracted path number 1211. From the chosen record entry, the host computer 10 extracts the operation state 1222. The host computer 10 then judges whether or not the extracted operation state 1222 says "offline".

In the case where the extracted operation state 1222 is "offline", the host computer 10 specifies, as a failure recovery site passing path, a path that is identified by the path number 1221 of the chosen record entry.

The host computer 10 next judges whether or not the failure recovery site passing path has successfully been specified in Step S1161 (S1162).

In the case where no failure recovery site passing path has been specified, the host computer 10 judges that the notified failure recovery site does not influence any paths, and proceeds directly to Step S1169.

In the case where a failure recovery site passing path has been specified, the host computer 10 registers the specified failure recovery site passing path in the path state change checking table 125 (S1163). In the case where the path state change checking table 125 holds previous information, the host computer 10 deletes every piece of the stored information from the path state change checking table 125. Thereafter, the host computer 10 registers the specified failure recovery site passing path in the path state change checking table 125.

To be specific, the host computer 10 stores the identifier of the specified failure recovery site passing path as the path number 1251 in the path state change checking table 125. The host computer 10 stores "offline" as the pre-failure detection state 1252 in the path state change checking table 125.

Next, the host computer 10 executes the offline path failure detecting processing of FIG. 20 (S1164).

The host computer 10 then updates the path state change checking table 125 (S1165).

To be specific, the host computer 10 selects record entries of the path state change checking table 125 one by one starting from the top of the table and proceeding downward. The host computer 10 performs the following processing on a chosen record entry.

The host computer 10 extracts the path number 1251 from the chosen record entry. Then the host computer 10 selects from the path failure information table 122 a record entry whose path number 1221 matches the extracted path number 1251.

From the chosen record entry, the host computer 10 extracts the operation state 1222. The host computer 10 stores the extracted operation state 1222 as the post-failure detection state 1253 of the record entry chosen from the path state change checking table 125.

The host computer 10 repeats this processing to thereby update the path state change checking table 125.

Next, the host computer 10 sequentially selects failure recovery site passing paths in the ascending order of path number. The host computer 10 performs the following processing on a chosen failure recovery site passing path (S1166).

The host computer 10 first judges whether or not the state of the chosen failure recovery site passing path has been changed before and after the failure detecting processing of FIG. 20 by referring to the path state change checking table 125 (S1167).

To be specific, the host computer 10 selects from the path state change checking table 125 a record entry whose path number 1251 matches the identifier of the chosen failure recovery site passing path. Then, the host computer 10 judges whether or not "offline" is stored as the pre-failure detection state 1252 and the post-failure detection state 1253 of the chosen record entry.

In the case where "offline" is stored as the pre-failure detection state 1252 and the post-failure detection state 1253 both, the host computer 10 judges that the state of the chosen failure recovery site passing path has not been changed, and ends the processing for this failure recovery site passing path.

In the case where "online" is stored as the post-failure detection state 1253, the host computer 10 judges that the state of the chosen failure recovery site passing path has changed from offline to online. In other words, the host computer 10 judges that the chosen failure recovery site passing path has recovered from a failure. The host computer 10 also judges that the failure origin passed by this failure recovery site passing path has recovered from the failure.

In this case, the host computer 10 updates the failure origin table 123 (S1168).

To be specific, the host computer 10 selects from the path connection information table 121 a record entry whose path number 1211 matches the identifier of the chosen failure recovery site passing path. From the chosen record entry, the host computer 10 extracts the HBA number 1212, the CHA number 1213, the CHA port number 1214, and the LU number 1215.

The host computer 10 deletes from the failure origin table 123 a record entry whose failure origin 1231 matches at least one of the extracted HBA number 1212, CHA number 1213, CHA port number 1214, and LU number 1215. The host computer 10 thus deletes, from the failure origin table 123, information on a failure origin site that has recovered from a failure.

Thereafter, the host computer 10 ends the processing for the chosen failure recovery site passing path. The host computer 10 repeats the processing until every failure recovery site passing path is chosen in Step S1166.

After finishing processing every failure recovery site passing path, the host computer 10 sends the updated failure origin table 123 to the management server 30 (S1169). The host computer 10 then ends the management server-prompted failure recovery processing.

As described above, when a failure occurs in a path, the host computer 10 according to the first embodiment of this invention performs failure detecting processing by sending a failure detection signal over a path for accessing the LU 25 shared by the path where the failure is detected. The host computer 10 blocks the path in which a failure is detected through the failure detecting processing. Thereafter, the host computer 10 sends I/O requests using only the paths that are not experiencing any failures. The failure detecting processing that utilizes failure detection signals takes shorter processing time than failure detecting processing that re-transmits an I/O request.

The computer system according to the first embodiment of this invention can therefore reduce processing delay upon occurrence of a failure compared to a system that selects paths by round robin.

In addition, when a failure occurs in a path, the host computer 10 according to the first embodiment of this invention estimates the origin of the failure, and blocks a path that passes the estimated failure origin. In short, the host computer 10 can block paths related to the cause of the failure.

The host computer 10 also notifies the management server 30 of the estimated failure origin. Notified of a failure origin by one host computer 10, the management server 30 notifies other host computers 10 of the notified failure origin. The other host computers 10 block paths that pass the notified failure origin.

The computer system according to the first embodiment of this invention thus enables other host computers 10 than the host computer 10 that has detected a failure, to block paths related to the failure.

When notified of the failure origin, each host computer 10 performs failure detecting processing by sending a failure detection signal over a path that passes the notified failure origin. All the host computers 10 that are notified of a failure origin individually estimate a failure origin, and notify the management server 30 of their individually estimated failure origins.

The management server 30 can therefore judge the validity of a failure origin notified from one host computer 10 by comparing failure origins notified from a plurality of host computers 10.

Second Embodiment

In the first embodiment of this invention, the host computer 10 deals with a failure in a path by sending an I/O request over an alternative path. In a second embodiment of this invention, when a failure occurs in a path, the host computer 10 performs failure detecting processing instead of sending an I/O request over an alternative path.

A computer system according to the second embodiment of this invention has the same configuration as the computer system of the first embodiment shown in FIG. 1A. Therefore, a description on the configuration of the computer system according to the second embodiment of this invention will be omitted.

The computer system according to the second embodiment of this invention performs the same processing as the computer system of the first embodiment does, except load balancing processing and failure dealing processing. The processing common to the first and second embodiments will not be described here.

Figure 26:
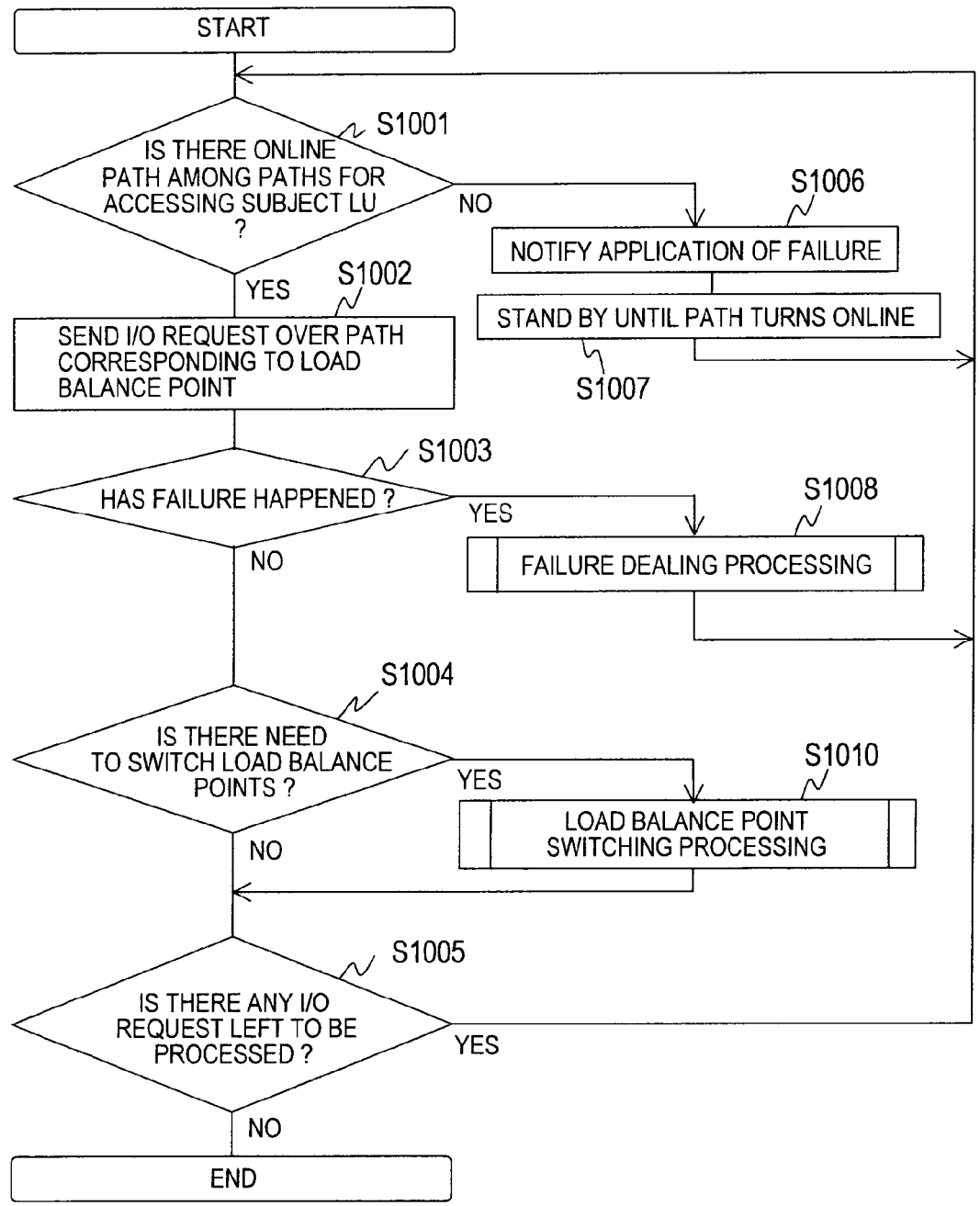
FIG. 26 is a flow chart for load balancing processing, which is executed by the host computer according to the second embodiment of this invention.

FIG. 26 is a flow chart for load balancing processing, which is executed by the host computer 10 according to the second embodiment of this invention.

The load balancing processing according to the second embodiment of this invention is the same as the load balancing processing described in the first embodiment with reference to FIG. 11, except that the load balancing processing of the second embodiment does not include Step S1009. The processing steps common to the first and second embodiments will be denoted by the same reference numbers.

The host computer 10 in the second embodiment of this invention does not send an I/O request over the alternative path. The host computer 10 therefore returns to Step S1001 immediately after finishing the failure dealing processing of Step S1008.

Figure 27:
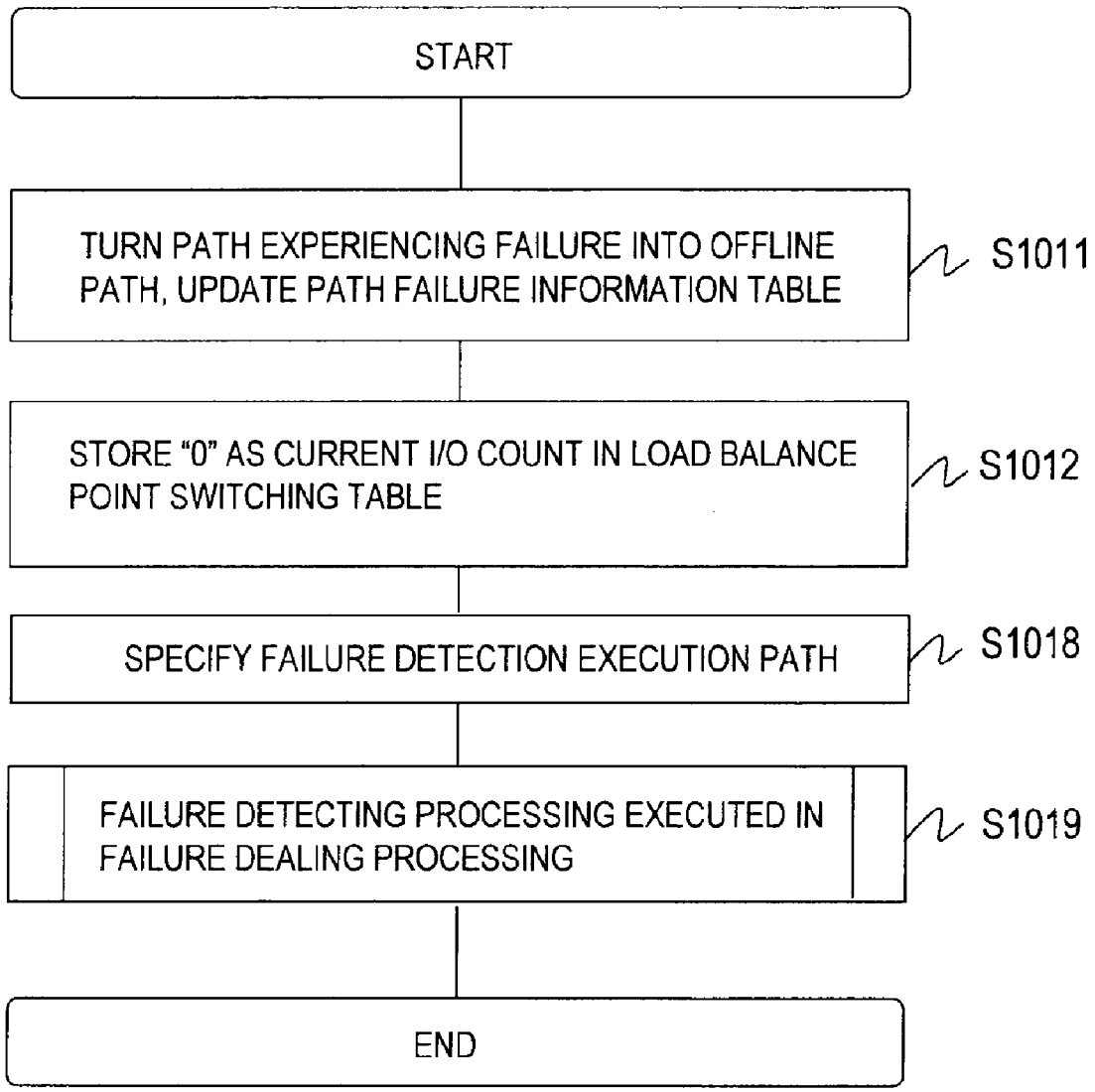
FIG. 27 is a flow chart for failure dealing processing, which is executed by the host computer according to the second embodiment of this invention.

FIG. 27 is a flow chart for failure dealing processing, which is executed by the host computer 10 according to the second embodiment of this invention.

The failure dealing processing according to the second embodiment of this invention is the same as the failure dealing processing described in the first embodiment with reference to FIG. 12, except that the failure dealing processing of the second embodiment does not include alternative path-related processing.

It should be noted that the failure dealing processing is executed in Step S1008 of the load balancing processing shown in FIG. 26.

The host computer 10 first blocks the path where a failure has occurred (takes the path off line). The host computer 10 then updates the path failure information table 122 (S1011).

Next, the host computer 10 selects from the load balance point switching table 124 a record entry whose load balance point 1243 matches the identifier of the path where the failure has occurred. As the current I/O count 1244 of the chosen record entry, the host computer 10 stores "0" (S1012).

Then, the host computer 10 specifies paths for accessing the LU 25 shared by the path where the failure has occurred. Out of the identified paths, the host computer 10 picks up online paths and specifies the online paths as failure detection execution paths (S1018).

Then the host computer 10 executes failure detecting processing performed when dealing with a failure as showing in FIG. 14, with respect to the specified failure detecting execution path (S1019).

Thereafter, the host computer 10 ends the failure dealing processing. Finishing the failure dealing processing, the host computer 10 returns to the load balancing processing of FIG. 26. The host computer 10 also performs propagator path blocking processing after the failure dealing processing is ended. In short, the host computer 10 executes the load balancing processing and the propagator path blocking processing in parallel.

As has been described, when a failure occurs in a path, the host computer 10 according to the second embodiment of this invention performs failure detecting processing instead of sending an I/O request over an alternative path.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   at least one first host computer having a processor, a memory, and an interface; and
   at least one storage system connected to the first host computer,
   wherein the storage system has a disk drive for storing data that is requested to be written by the first host computer and a disk controller for controlling the disk drive, and provides a storage area of the disk drive as at least one logical unit to the first host computer,
   wherein upon detecting a failure in a logical path serving as an access route from the first host computer to the logical unit, the first host computer specifies logical paths for accessing the logical unit,
   wherein the first host computer executes failure detecting processing for the specified logical paths to judge whether the specified logical paths are normal or not,
   wherein the first host computer selects normal logical paths out of the specified logical paths,
   wherein the first host computer accesses the logical unit via the selected normal logical paths,
   wherein the first host computer stores logical path connection information, which indicates association between the logical path and components passed by the logical path,
   wherein the first host computer blocks the logical path where a failure is detected and a logical path that is judged as abnormal through the failure detecting processing,
   wherein the first host computer estimates, as a cause of the failure, a component passed by only the blocked logical paths by referring to the logical path connection information,
   the computer system further comprising a management server connected to the first host computer,
   wherein the first host computer notifies the management server of the estimated cause of the failure,
   wherein the management server notifies the estimated cause of the failure, which is notified by the first host computer, to a second host computer, which is not the first host computer,
   wherein the second host computer specifies the logical paths that pass the notified cause of the failure,
   wherein the second host computer executes failure detecting processing for the specified logical paths to judge whether the specified logical paths are normal or not,
   wherein the disk controller has at least one channel adapter connected to the first host computer,
   wherein the first host computer has at least one host bus adapter connected to the storage system, and
   wherein the first host computer estimates the host bus adapter, the channel adapter, or the logical unit as a cause of a failure.

2. A logical path switching method for a computer system that includes at least one first host computer having a processor, a memory, and an interface, at least one storage system connected to the first host computer, and a management server connected to the first host computer, wherein the storage system has a disk drive for storing data that is requested to be written by the first host computer and a disk controller for controlling the disk drive, the logical path switching method comprising the steps of:

providing, by the storage system, a storage area of the disk drive to the first host computer;

upon detecting a failure in a logical path serving as an access route from the first host computer to the logical unit, specifying, by the first host computer, logical paths for accessing the logical unit;

executing, by the first host computer, failure detecting processing for the specified logical paths to judge whether the specified logical paths are normal or not;

selecting, by the first host computer, normal logical paths out of the specified logical paths;

accessing, by the first host computer, the logical unit via the selected normal logical paths;

storing, by the first host computer, logical path connection information, which indicates association between the logical path and components passed by the logical path;

blocking, by the first host computer, the logical path where a failure is detected and a logical path that is judged as abnormal through the failure detecting processing;

estimating, by the first host computer, as a cause of the failure, a component passed by only the blocked logical paths by referring to the logical path connection information;

notifying, by the first host computer, the management server of the estimated cause of the failure;

notifying, by the management server, the estimated cause of the failure, which is notified by the first host computer, to a second host computer, which is not the first host computer;

specifying, by the second host computer, the logical paths that pass the notified cause of the failure;

executing, by the second host computer, failure detecting processing for the specified logical paths to judge whether the specified logical paths are normal or not, and in the failure detecting processing, further executing by the first host computer, failure detecting processing also for the logical path for accessing a logical unit that is different from the logical unit accessed by the logical path where the failure is detected.

3. A logical path switching method for a computer system that includes:

a plurality of host computers, each containing a processor, a memory, and an interface, at least one storage system connected to the host computers, and a management server containing a processor, a memory, and an interface and connected to the host computers, wherein the storage system has a disk drive for storing data that is requested to be written by the host computers and a disk controller for controlling the disk drive, wherein the host computers include a first host computer and a second host computer, and wherein the logical path switching method comprises the steps of:

providing, by the storage system, a storage area of the disk drive as one or more logical units to the first host computer and the second host computer;

storing, by the first host computer, logical path connection information indicating association between a logical path serving as an access route from the first host computer to the logical unit and components passed by the logical path;

identifying, by the first host computer, which ones of all logical paths are currently blocked;

executing, by the first host computer, failure detecting processing for the logical paths identified as blocked paths to judge whether the logical paths identified as blocked paths are normal or not;

selecting, by the first host computer, normal logical paths out of the logical paths identified as blocked paths;

referring, by the first host computer, to the logical path connection information to estimate, as a component that has recovered from a failure, one of failure recovery components passed by the selected normal logical paths;

notifying, by the first host computer, the management server of the estimated failure recovery component; and notifying, by the management server, the estimated failure recovery component to the second host computers.

* * * * *